(12) United States Patent
Jacobs et al.

(10) Patent No.: US 11,876,201 B1
(45) Date of Patent: Jan. 16, 2024

(54) THERMAL COMPONENT

(71) Applicant: Rivian IP Holdings, LLC, Plymouth, MI (US)

(72) Inventors: Tyler Jacobs, Redondo Beach, CA (US); Aaron Churchill, Irvine, CA (US); Christopher LaMorte, Anaheim, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 17/820,102

(22) Filed: Aug. 16, 2022

(51) Int. Cl.
| | |
|---|---|
| *H01M 10/6554* | (2014.01) |
| *B60K 1/04* | (2019.01) |
| *H01M 10/613* | (2014.01) |
| *H01M 10/625* | (2014.01) |
| *B60L 50/64* | (2019.01) |

(52) U.S. Cl.
CPC .......... *H01M 10/6554* (2015.04); *B60K 1/04* (2013.01); *B60L 50/64* (2019.02); *H01M 10/613* (2015.04); *H01M 10/625* (2015.04); *H01M 2220/20* (2013.01)

(58) Field of Classification Search
CPC ......... H01M 10/6554; H01M 2220/20; H01M 10/625; H01M 10/613; B60K 1/04; B60L 50/64
See application file for complete search history.

(56) References Cited

U.S. PATENT DOCUMENTS

| | | | | |
|---|---|---|---|---|
| 7,291,420 | B2 * | 11/2007 | Bitsche | F28F 1/08 |
| | | | | 429/120 |
| 11,223,081 | B2 | 1/2022 | Collins | |
| 2010/0124693 | A1 * | 5/2010 | Kosugi | H01M 50/505 |
| | | | | 429/92 |
| 2010/0273042 | A1 * | 10/2010 | Buck | H01M 10/6551 |
| | | | | 429/120 |
| 2011/0045334 | A1 * | 2/2011 | Meintschel | H01M 50/505 |
| | | | | 429/120 |
| 2014/0246259 | A1 * | 9/2014 | Yamamura | H01M 50/204 |
| | | | | 180/68.5 |
| 2015/0221998 | A1 * | 8/2015 | Jin | H01M 10/6553 |
| | | | | 429/120 |
| 2017/0005378 | A1 * | 1/2017 | Rong | H01M 50/227 |
| 2020/0203788 | A1 * | 6/2020 | Kang | H01M 10/613 |

FOREIGN PATENT DOCUMENTS

| | | | | |
|---|---|---|---|---|
| CN | 111834703 | * | 10/2020 | |
| DE | 10-2019-105424 | * | 9/2019 | ........ H01M 10/6556 |
| KR | 10-2016-0141980 | * | 12/2016 | ........ H01M 10/6556 |
| WO | WO 2020/028931 | * | 2/2020 | ............. H01M 2/10 |
| WO | WO 2020/018739 | * | 1/2022 | .......... H01M 10/613 |

OTHER PUBLICATIONS

WO 2020/028931 machine English translation (Year: 2020).*
KR 10-2016-0141980 machine English translation (Year: 2016).*
DE 10-2019-105424 (Year: 2019).*

* cited by examiner

*Primary Examiner* — Michael L Dignan

(74) *Attorney, Agent, or Firm* — Foley & Lardner LLP

(57) ABSTRACT

An apparatus can include a thermal component that can couple with a battery module at a middle portion of the battery module. The thermal component can include a flange that extends from a side wall of the battery module. The flange of the thermal component can be disposed between a first tote flange of the battery module and a second tote flange of the battery module.

20 Claims, 22 Drawing Sheets

THERMAL COMPONENT

INTRODUCTION

Electric vehicles can include batteries that provide power to the electric vehicle. The batteries can be electrically coupled with vehicle components to power the vehicle.

SUMMARY

Electrical systems, such as a battery module, may include one or more thermal components to facilitate thermally regulating the battery module. The systems and methods of the present technical solution include an apparatus of a battery pack system. The apparatus can include a thermal component (e.g., a cold plate) having a flange. The thermal component can couple with a lower, middle, or upper portion of a battery module, among other portions of the battery module. The flange of the thermal component can facilitate coupling the battery module with a portion of a battery pack at an approximate center of gravity of the battery module such that the weight of the battery module is substantially evenly distributed. The flange of the thermal component can include one or more alignment features to facilitate aligning the battery module with a portion of the battery pack. The thermal component and the flange can be monolithically formed to improve efficiency of manufacturing by reducing part count and assembly sequence. The flange can be disposed between two carrier tote flanges. The flange can include a flange extension that extends perpendicularly from the flange.

At least one aspect is directed to an apparatus. The apparatus can include a thermal component that can couple with a battery module at a middle portion of the battery module. The thermal component can include a flange that protrudes from a side wall of the battery module. The thermal component can include a flange extension that extends at least partially along the side wall of the battery module. The flange extension can support at least a portion of the side wall of the battery module.

At least one aspect is directed to a battery module. The battery module can include a first submodule and a second submodule. The battery module can include a thermal component that can couple with the first submodule and the second submodule between the first submodule and the second submodule. The thermal component can include a flange that extends from the thermal component beyond a first side wall of the first submodule and a second side wall of the second submodule. The thermal component can include a flange extension that extends at least partially along the side wall of the battery module. The flange extension can support at least a portion of the first side wall of the first submodule and a portion of the second side wall of the second submodule.

At least one aspect is directed to a method. The method can include coupling a thermal component with a battery module at a middle portion of the battery module. The method can include disposing a flange of the thermal component to protrude from a side wall of the battery module. The method can include disposing a flange extension coupled with the thermal component to extend from a first side of the flange and from a second opposing side of the flange.

At least one aspect is directed to an apparatus. The apparatus can include a thermal component that can couple with a battery module at a middle portion of the battery module. The thermal component can include a flange having a first side and a second side. The first side of the flange can engage with a first portion of the battery module and the second side of the flange can engage with a second portion of the battery module.

At least one aspect is directed to an electric vehicle. The electric vehicle can include a battery pack having a battery module. The electric vehicle can include a thermal component that can couple with a battery module at a middle portion of the battery module. The thermal component can include a flange that protrudes from a side wall of the battery module. The thermal component can include a flange extension that extends at least partially along the side wall of the battery module. The flange extension can support at least a portion of the side wall of the battery module.

At least one aspect is directed to a method. The method can include providing an apparatus. The apparatus can include a thermal component that can couple with a battery module at a middle portion of the battery module. The thermal component can include a flange that protrudes from a side wall of the battery module. The thermal component can include a flange extension that extends at least partially along the side wall of the battery module. The flange extension can support at least a portion of the side wall of the battery module.

At least one aspect is directed to a system. The system can include a battery module having a thermal component that can couple with the battery module at a middle portion of the battery module. The system can include a first cross member that can couple with a first side of the thermal component. The system can include a second cross member that can couple with a second side of the thermal component.

At least one aspect is directed to an apparatus. The apparatus can include a thermal component that can couple with a battery module at a middle portion of the battery module. The thermal component can include a flange that extends from a side wall of the battery module. The flange of the thermal component can be disposed between a first tote flange of the battery module and a second tote flange of the battery module.

At least one aspect is directed to a battery module. The battery module can include a first exterior carrier for a first submodule and a second exterior carrier for a second submodule. The first exterior carrier can include a first tote flange and the second exterior carrier can include a second tote flange. The battery module can include a thermal component having a flange that extends from the thermal component beyond a first side wall of the first submodule and a second side wall of the second submodule. The flange of the thermal component can be coupled with the first submodule and the second submodule between the first tote flange of the first submodule and the second tote flange of the second submodule.

At least one aspect is directed to a method. The method can include coupling a thermal component with a battery module at a middle portion of the battery module. The method can include disposing a flange of the thermal component to extend from a side wall of the battery module. The method can include disposing the flange between a first tote flange of the battery module and a second tote flange of the battery module.

At least one aspect is directed to an electric vehicle. The electric vehicle can include a battery pack having a battery module. The electric vehicle can include a thermal component that can couple with the battery module at a middle portion of the battery module. The thermal component can include a flange that extends from a side wall of the battery module. The flange of the thermal component can be disposed between a first tote flange of the battery module and a second tote flange of the battery module.

At least one aspect is directed to a method. The method can include providing an apparatus. The apparatus can include a thermal component that can couple with a battery module at a middle portion of the battery module. The thermal component can include a flange that extends from a side wall of the battery module. The flange of the thermal component can be disposed between a first tote flange of the battery module and a second tote flange of the battery module.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 22 depicts an example illustration of a method, in accordance with implementations.

DETAILED DESCRIPTION

Figure 1:
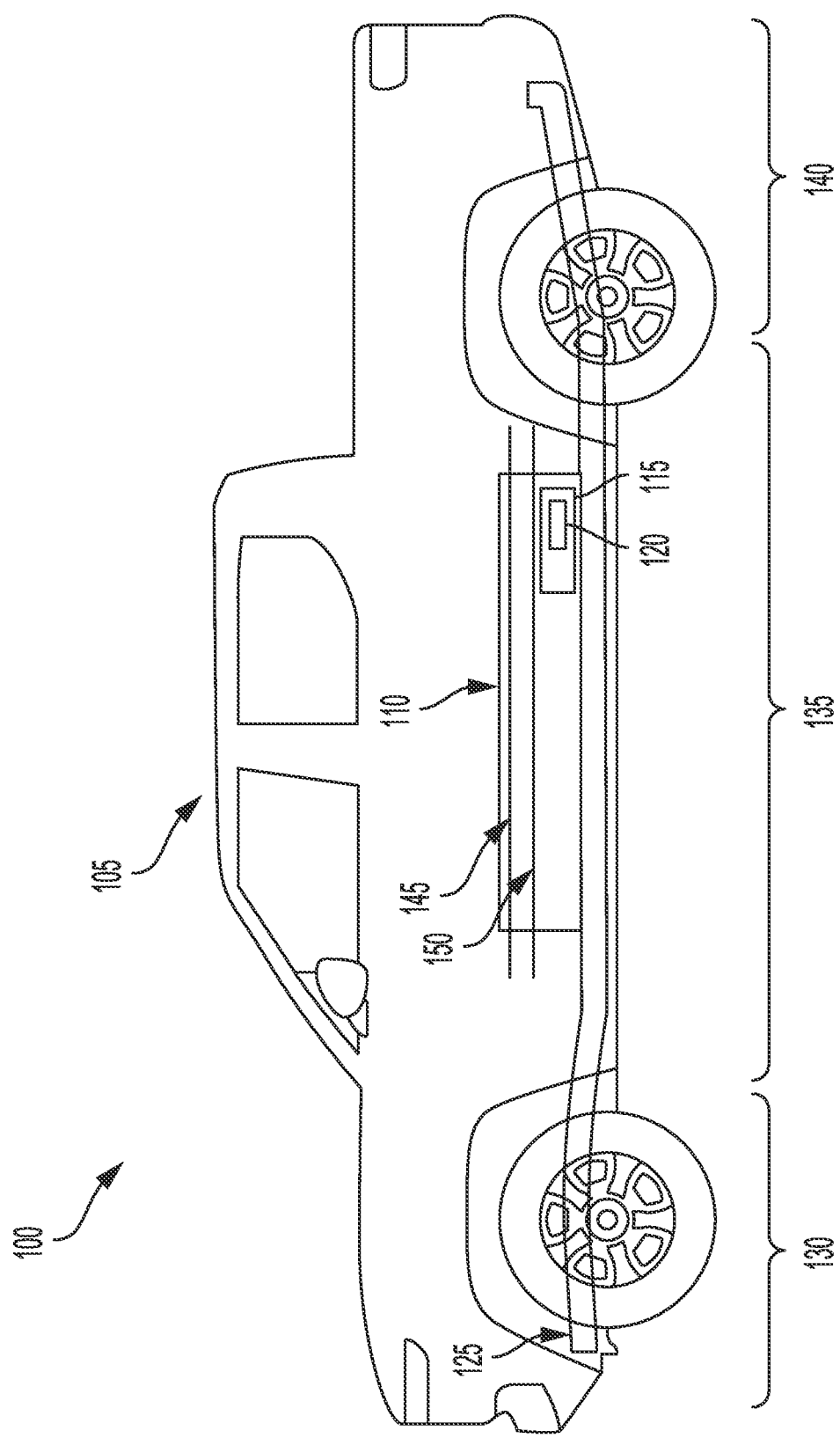
FIG. 1 depicts an example side view of an electric vehicle, in accordance with implementations.

Following below are more detailed descriptions of various concepts related to, and implementations of, methods, apparatuses, and systems of coupling a battery with a vehicle. The various concepts introduced above and discussed in greater detail below may be implemented in any of numerous ways.

The present disclosure is directed to an apparatus (e.g., a mounting apparatus) for a battery module. The apparatus can include a thermal component (e.g., a cold plate) that can couple with the battery module at a middle portion of the battery module. For example, the battery module can include a top submodule and a bottom submodule. The middle portion of the battery module can be disposed between the top submodule and the bottom submodule. The thermal component can include a flange that extends from the battery module. The flange can include a first side and a second side. The thermal component can connect with a first cross member (e.g., a keystone cross member) at the first side of the flange and a second cross member at the second side of the flange. The first side and the second side of the flange can at least partially oppose one another such that the first cross member can be disposed at least partially above the second cross member. The flange of the thermal component can include an aperture (e.g., hole, slot, opening) to receive a portion of a fastener to facilitate connecting the thermal component with the first cross member and the second cross member. Because the thermal component is positioned at a middle portion of the battery module (e.g., +/−10% from a midpoint of the battery module, between the top submodule and the bottom submodule), the thermal component can facilitate mounting the battery module to the first and second cross members such that the battery module is mounted at a point that is substantially parallel to the center of gravity of the module (e.g., +/−10% from a midpoint of the battery module). The thermal component can include a support (e.g., a flange extension or an extension) that extends from the flange to support the top submodule and bottom submodule. Additionally or alternatively, an exterior carrier of the top submodule and an exterior carrier of the bottom submodule can include one or more flanged portions that at least partially surround the flange of the thermal component.

The disclosed solutions have a technical advantage of mounting a battery module at an approximate center of mass of the battery module such that a substantially even amount of weight is distributed on each side of the battery module (e.g., as compared to mounting the battery module to another portion of a vehicle along a topmost or bottommost portion of the battery module). For example, mounting the battery module proximate a center of gravity of the battery module reduces a cantilevered or substantially uneven distribution of the weight of the battery module, which can cause excessive strain on one or more fasteners that mount the battery module to the vehicle. The disclosed solutions have a technical advantage of disposing a thermal component (e.g., a cold plate) directly within a portion of the battery module to provide efficient thermal regulation of the battery module. For example, the thermal component can include a top surface positioned adjacent to a top submodule of the battery module and an opposing bottom surface positioned adjacent to a bottom submodule of the battery module, such that each of the submodules are exposed to the thermal regulation of the thermal component. The disclosed solutions have a technical advantage of reducing part count and increasing assembly sequence. For example, the thermal component can include a flange or a support (e.g., a flange extension, also referred to simply as extension) formed with the thermal component, which can reduce additional materials or parts to support the top and bottom submodules. As another example, an exterior carrier of the top submodule and an exterior carrier of the bottom submodule can include flanged portions that surround and compress the flange of the thermal component, which may reduce additional materials or parts to support the top and bottom submodules or to facilitate mounting the battery module to a portion of the vehicle.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
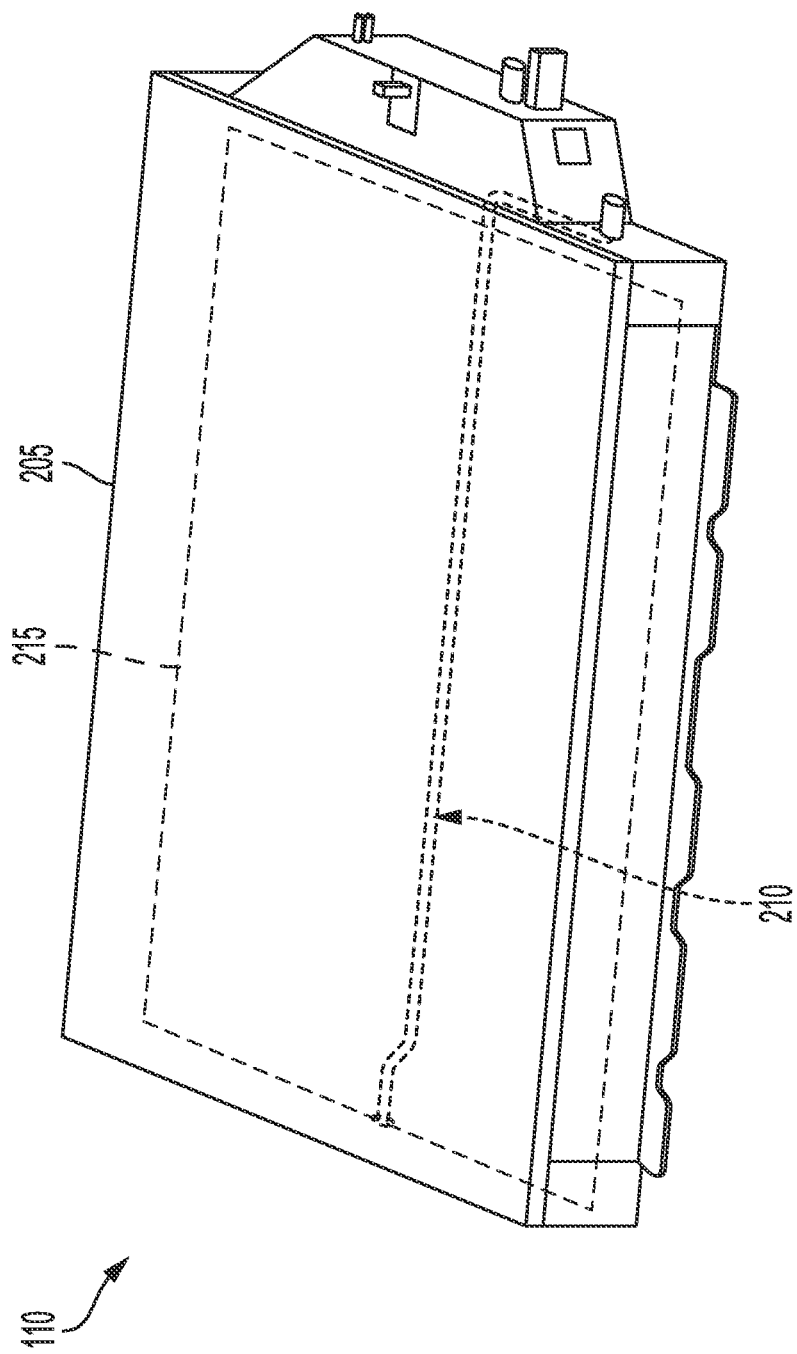
FIG. 2A depicts an example perspective view of a battery pack, in accordance with implementations.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, as described herein. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
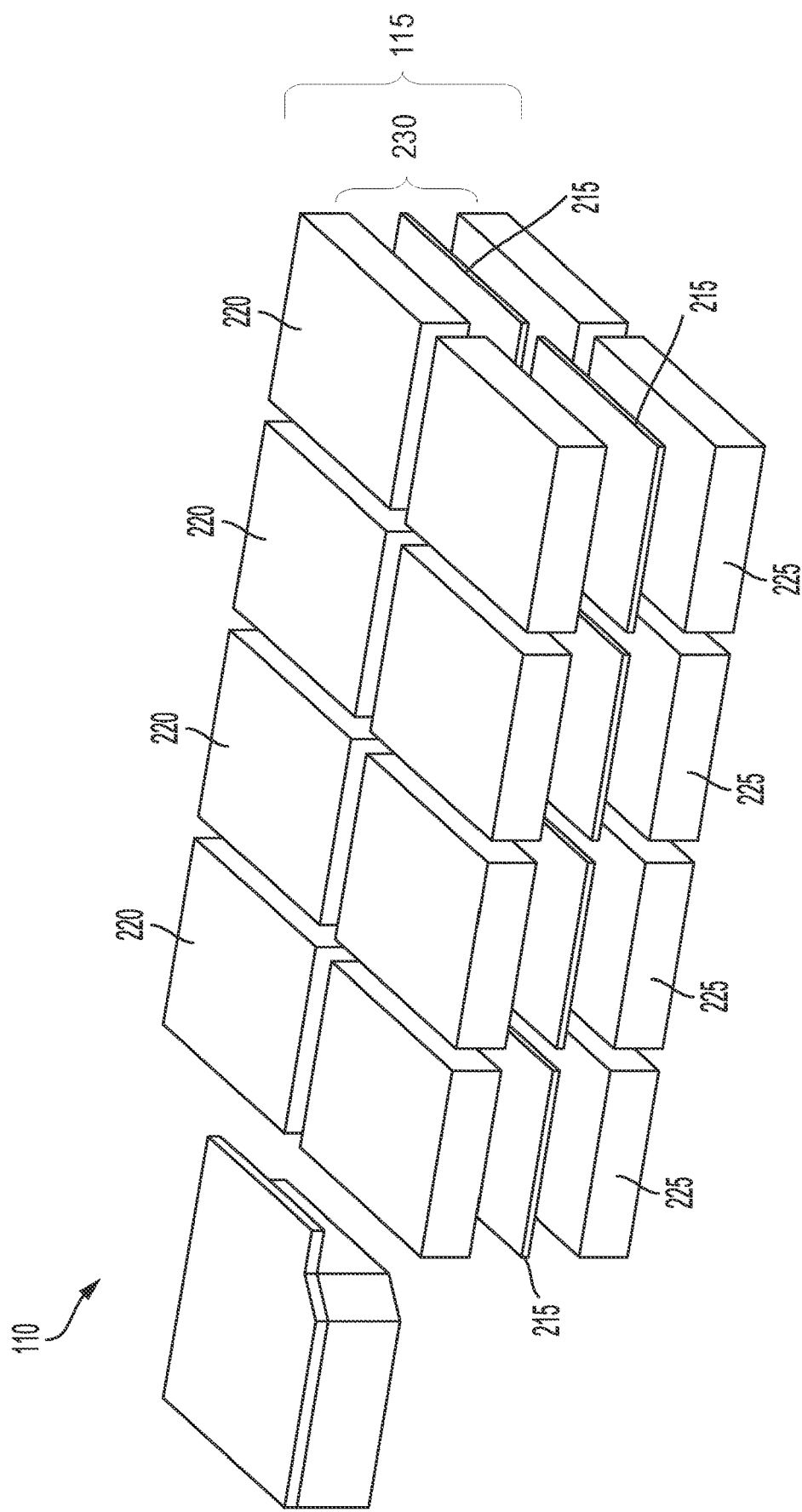
FIG. 2B depicts an example perspective view of a battery module, in accordance with implementations.

FIG. 2B depicts example battery modules 115. The battery modules 115 can include at least one submodule. For example, the battery modules 115 can include at least one first (e.g., top) submodule 220 or at least one second (e.g., bottom) submodule 225. At least one thermal component 215 can be positioned (e.g., disposed) between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115.

The battery modules 115 can each include a plurality of battery cells 120. The battery modules 115 can be disposed within the housing 205 of the battery pack 110. The battery modules 115 can include battery cells 120 that are cylindrical cells, prismatic cells, pouch cells, or pack cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, with a thermal component 215 in between the top submodule 220 and the bottom submodule 225 as described herein. The battery pack 110 can include or define a plurality of areas for positioning of the battery module 115 or the cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, pouch, elongated, or prismatic form factor. Battery cells 120 can be assembled, for example, by inserting a winded or stacked electrode roll (e.g., a jelly roll) including electrolyte material into at least one battery cell housing. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal (e.g., a positive or anode terminal) and a second polarity terminal (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include organic polymeric-based electrolytes or inorganic electrolytes, for example phosphide-based or Sulfide-based solid-state electrolytes (e.g., $Li_3PS_4$, $Li_7P_3S_{11}$, $Li_2S$—$P_2S_5$, $Li_6PS_5Cl$). Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing can be disposed in the battery module 115, the battery pack 110, or a battery array installed in the electric vehicle 105. The housing can be of any shape, such as cylindrical with a circular (e.g., as depicted), elliptical, or ovular base, among others. The shape of the housing can also be prismatic with a polygonal base, such as a triangle, a square, a rectangle, a pentagon, and a hexagon, among others. The battery pack 110 may not include modules 115. For example, the battery pack 110 can have a cell-to-pack configuration wherein battery cells 120 are arranged directly into a battery pack 110 without assembly into a module 115.

Figure 3:
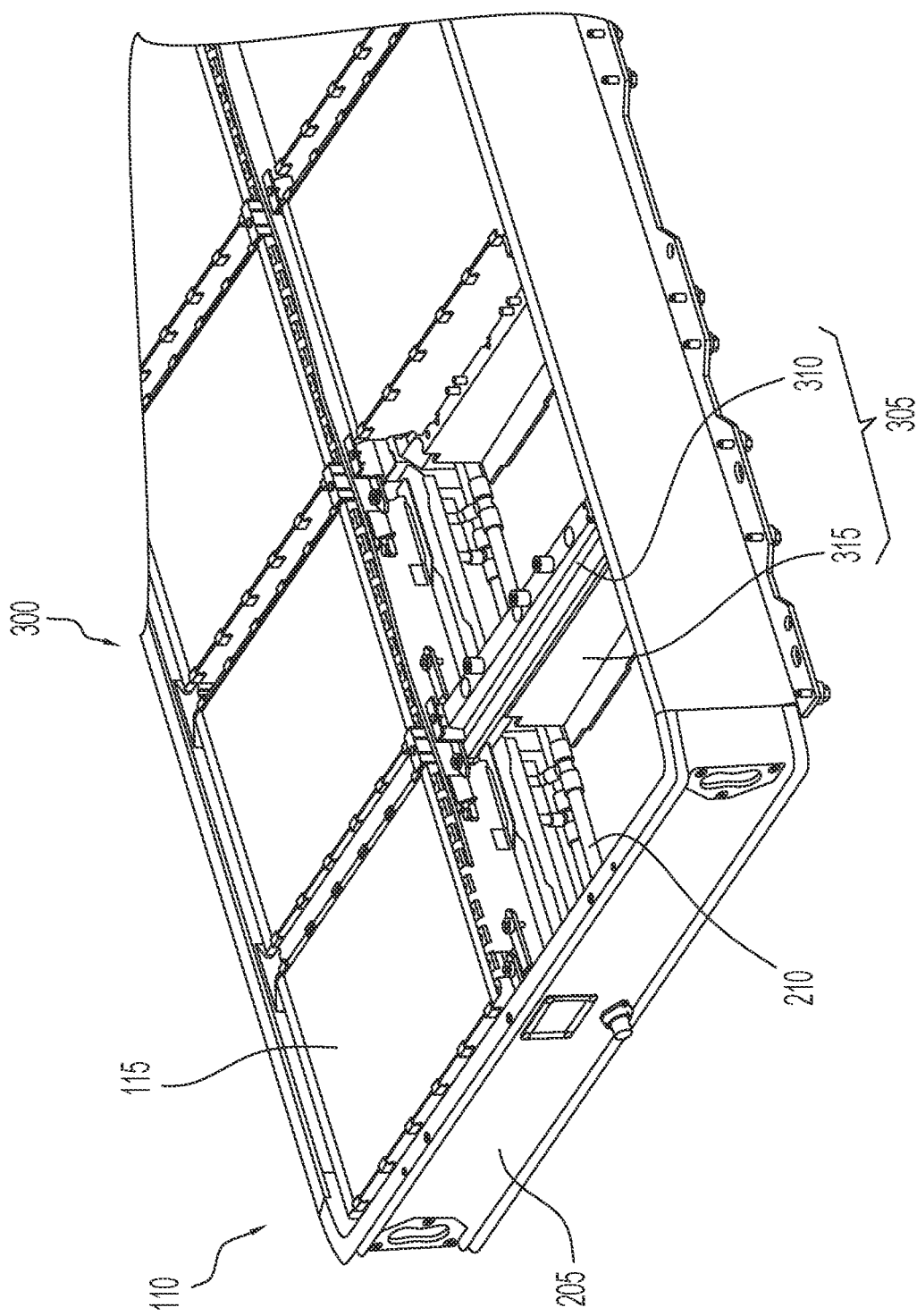
FIG. 3 depicts an example perspective view of a battery pack system, in accordance with implementations.

FIG. 3 depicts an example perspective view of a battery pack system 300 of the vehicle 105. The battery pack system 300 can include at least one battery pack 110 having one or more battery modules 115 coupled with the battery pack 110. The battery pack system 300 can include at least one apparatus 305. For example, the apparatus 305 can include various components that facilitate coupling at least one battery module 115 with the battery pack 110 or with another portion of the vehicle 105.

Figure 4:
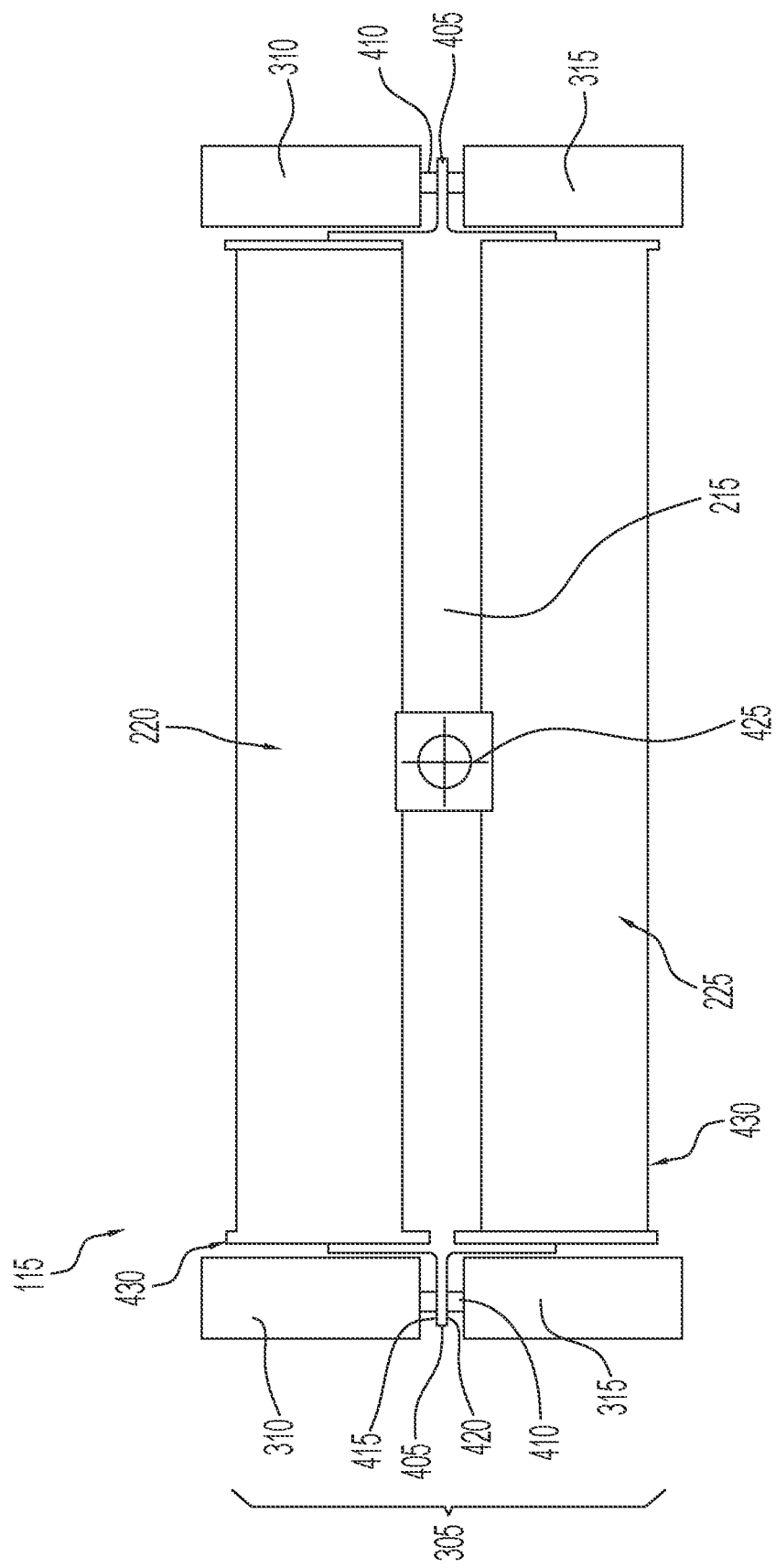
FIG. 4 depicts an example front view of a portion of the battery pack system of FIG. 3, in accordance with implementations.

FIG. 4 depicts an example side view of a portion of the battery pack system 300. For example, FIG. 4 depicts an example side view of a battery module 115 and a portion of the apparatus 305 of the battery pack system 300. The apparatus 305 can include at least one thermal component 215. For example, the thermal component 215 can be or can include a cold plate. The thermal component 215 can be or can include various other components including, but not limited to, a heater, radiator, chiller, or another component.

The thermal component 215 can couple with the battery module 115 at a middle portion 230 (depicted in at least FIG. 2B) of the battery module 115. For example, as described herein, the thermal component 215 can be positioned in between the first submodule 220 and the second submodule 225 of the battery module 115. The first submodule 220 and the second submodule 225 can be about (e.g., within 10%) the same size as one another such that the thermal component 215 is positioned (e.g., disposed) at a middle portion 230 of the battery module 115. For example, the middle portion 230 of the battery module 115 can be located between a first end surface of the first submodule 220 and a second end surface of the second submodule 225 (e.g., the middle portion 230 is between the first submodule 220 and the second submodule 225, the middle portion 230 is at an approximate center portion of the battery module 115 which includes the first submodule 220 and the second submodule 225, the middle portion 230 of the battery module 115 is generally positioned away from a topmost portion or bottommost portion of the battery module 115). For example, the middle portion 230 of the battery module 115 can be between the bottommost 15% of the first submodule 220 and the topmost 15% of the second module 225, as depicted in at least FIG. 2B, and among others.

The thermal component 215 can include at least one flange 405. For example, the thermal component 215 can include two flanges 405 that substantially oppose one another. The flange 405 can be or can include one or more surfaces or protrusions of the thermal component 215 that extend or protrude from a side wall of the battery module 115 (e.g., at least one flange 405 on each side of the battery module 115 as depicted throughout the figures). The flange 405 can extend from the thermal component 215 at the middle portion 230 of the battery module 115 such that the flange 405 extends beyond the battery module 115. For example, the flange 405 can extend from or beyond a portion of the side walls/surfaces 520 and 525 (depicted in at least FIG. 5) of the battery module 115. The flange 405 can extend above, below, or beyond the side walls/surfaces 520 and 525. The flange 405 can extend at an angle relative to a side wall (e.g., side walls/surface 520 or 525) of the battery module 115. For example, the flange 405 can extend substantially orthogonal relative to a side surface of the battery module 115. It should be understood that the thermal component 215 can include two flanges 405 that can be symmetrically or oppositely disposed about the thermal component 215.

The thermal component 215 can be or can include a variety of materials including various metallic materials (e.g., steel, aluminum, brass, copper, magnesium, various alloys or any combination thereof, or another metallic material). The thermal component 215 can include one or more non-metallic materials (e.g., plastic, rubber, or another non-metallic material). The thermal component 215 be formed by a variety of manufacturing processes. For example, the thermal component 215 can be formed via one or more casting manufacturing process (e.g., expendable mold casting, non-expendable mold casting, die casting, plaster casting, sand casting, investment casting, or another type of casting). The thermal component 215 can be formed via a variety of other techniques including, but not limited to, forging, machining, welding, stamping, or other techniques.

The flange 405 can be monolithically (e.g., integrally, continuously) formed with the thermal component 215 such that the thermal component 215 and the flange 405 form one continuous structure. For example, the flange 405 can be formed with the thermal component 215 via casting. The flange 405 can couple with the thermal component 215 in a variety of other ways. For example, the flange 405 can be formed with the thermal component 215 by one or more welded joints, fasteners, adhesives, or other techniques.

The apparatus 305 can include or can couple with at least one first cross member 310. For example, the first cross member 310 can be or can include a structural beam, plank, pillar, axle, crossbar, pole, or other member that extends at least a portion of a length or width of the battery pack 110. For example, as depicted in at least FIG. 3, the first cross member 310 can extend laterally across a portion of the battery pack 110 such that the first cross member 310 extends substantially parallel to at least one side portion (e.g., a side wall or side surface 520 depicted in at least FIG. 5) of a battery module 115 of the battery pack 110. The first cross member 310 can extend partially across the battery pack 110 (e.g., about 25% of the width of the battery pack 110 in a lateral direction, about 50% of the width of the battery pack 110, or another width). The first cross member 310 can extend across a majority of the battery pack 110 (e.g., about 90% of the width of the battery pack 110, about 95% of the width of the battery pack 110, about the length of two battery modules 115 of the battery pack 110, or another width).

The apparatus 305 can include or can couple with at least one second cross member 315. For example, the second cross member 315 can be or can include a structural beam, plank, pillar, axle, crossbar, pole, or other member that extends at least a portion of a length or width of the battery pack 110. For example, as depicted in at least FIG. 3, the second cross member 315 can extend laterally across a portion of the battery pack 110 such that the second cross member 315 extends substantially parallel to at least one side portion of a battery module 115 of the battery pack 110. The second cross member 315 can extend partially across the battery pack 110 (e.g., about 25% of the width of the battery pack 110 in a lateral direction, about 50% of the width of the battery pack 110, or another width). The second cross member 315 can extend across a majority of the battery pack 110 (e.g., about 90% of the width of the battery pack 110, about 95% of the width of the battery pack 110, about the length of two battery modules 115 of the battery pack 110, or another width).

The second cross member 315 can be disposed beneath a portion of the first cross member 310. For example, the first cross member 310 can be or can include a keystone cross member. The first cross member 310 and the second cross member 315 can extend different lengths along a width of the battery pack 110. For example, the second cross member 315 can extend about halfway across the width of the battery pack 110 (e.g., about 40-60% of the width of the battery pack 110, about the length of a side portion of the battery module 115, or another distance). The first cross member 310 can extend about the entire distance of the width of the battery pack 110 (e.g., about 80-100% of the width of the battery pack 110, about the length of a side portion of two battery modules 115, or another distance). For example, the first cross member 310 can continuously extend adjacent to at least two battery modules 115 and the second cross member 315 can continuously extend adjacent to at least one battery module 115.

The thermal component 215 can connect with the first cross member 310 and the second cross member 315. For example, the flange 405 of the thermal component 215 can engage with the first cross member 310 and the second cross member 315 to couple the thermal component 215 with the first cross member 310 and the second cross member 315. For example, the flange can include a first side 415 and a second side 420. The first side 415 can at least partially oppose the second side 420. The first side 415 of the flange 405 can engage (e.g., receive, abut, contact, or otherwise be positioned adjacent to) a portion of the first cross member 310. The second side 420 of the flange 405 can engage (e.g., receive, abut, contact, or otherwise be positioned adjacent to) a portion of the second cross member 315. For example, the thermal component 215 can couple with the first cross member 310 and the second cross member 315 such that the flange 405 is disposed between a bottom surface of the first cross member 310 (e.g., such that the first cross member 310 is positioned on the first side 415 of the flange 405) and a top surface of the second cross member 315 (e.g., such that the second cross member 315 is positioned on the second side 420 of the flange 405).

The thermal component 215 can thermally couple with the first submodule 220 and the second submodule 225 such that the thermal component 215 can thermally regulate at least one battery cell 120 of the first submodule 220 or the second submodule 225. For example, as described herein, the first submodule 220 or the second submodule 225 can include an exterior carrier tote (e.g., exterior carrier 430) that can facilitate carrying the battery cells 120. The exterior carrier 430 can include one or more surfaces, apertures, supports, or other components that can receive a plurality of battery cells 120 to form the submodule. In other words, the exterior carrier 430 can include a casing that carries the battery cells 120 of the submodule. The thermal component 215 can couple with each exterior carrier 430 of the first submodule 220 and the second submodule 225 such that the thermal component 215 is disposed between the bottommost surface of the exterior carrier 430 of the first submodule 220 and the topmost surface of the exterior carrier 430 of the second submodule 225. The thermal component 215 can couple with the exterior carriers 430 by one or more adhesives, fasteners, welds, or other techniques. For example, the thermal component 215 can couple with the exterior carrier 430 by the battery cells 120 (e.g., a surface of the battery cell 120 can couple with a surface, such as the flow path 1005 described herein, of the thermal component 215 by a thermal adhesive). The thermal component 215 can be coated in a dielectric material (e.g., powder coating, paints, or other isolating materials).

As described herein, the flange 405 or another portion of the thermal component 215 can include at least one aperture (e.g., hole, slot, opening, or other aperture) to receive at least one fastener 410 (e.g., bolt, screw, clamp, or other fastener) that facilitates coupling the first cross member 310, the flange 405 of the thermal component 215, and the second cross member 315. For example, at least one fastener 410 can extend through a portion of an aperture of the first cross member 310, through a portion of an aperture of the flange 405, and through a portion of an aperture of the second cross member 315 such that the first cross member 310, the thermal component 215, and the second cross member 315 are fixed relative to one another. The fastener 410 can extend a vertical length that is about equal to or greater than a combined vertical length of the first cross member 310, the flange 405, and the second cross member 315 such that the fastener 410 extends through at least a portion of each of the first cross member 310, the flange 405, and the second cross member 315. For example, the fastener 410 can facilitate coupling the first cross member 310, the flange 405, and the second cross member 315 together such that relative movement between the first cross member 310, the flange 405 (and therefore the thermal component 215 and submodules), and the second cross member 315 is limited.

The apparatus 305 can facilitate coupling the battery module 115 with the battery pack 110 or with another portion of the vehicle 105. For example, the first cross member 310 and the second cross member 315 can couple with a portion of the battery pack 110 in a variety of ways (e.g., by welding, adhesives, fasteners, or other techniques). The thermal component 215 can couple with the battery module 115 at a middle portion 230 of the battery module 115 (e.g., between a bottom surface of the first submodule 220 and a top surface of the second submodule 225) and the thermal component 215 can couple with the first cross member 310 and the second cross member 315 via the one or more fasteners 410 such that the battery module 115 is coupled with the battery pack 110 between the first cross member 310 and the second cross member 315 (e.g., the flange 405 of the thermal component 215 is disposed between the first cross member 310 and the second cross member 315).

The thermal component 215 can couple with the battery module 115 at an approximate center of gravity 425 of the battery module 115 such that the thermal component passes through the center of gravity 425 of the battery module 115. For example, the flange 405 can extend approximately through a center of gravity 425 of the battery module 115 (e.g., the flange 405 is positioned at approximately the same vertical distance from the bottom of the battery pack 110 as the center of gravity 425 of each battery module 115) such that a plane that extends through an aperture of the flange 405 extends through a point of the battery module 115 that is proximate the center of gravity 425 (e.g., within 10% of the height of the battery module 115 in a vertical direction from the second submodule 225 to the first submodule 220). With this configuration, the mass (e.g., weight) of the battery module 115 is substantially equally distributed (e.g., about half the mass is distributed on the first side 415 of the flange 405 proximate the first submodule 220 and about half the mass is distributed on the second side 420 of the flange 405 proximate the second submodule 225), increasing the structural efficiency of the battery pack system 300. For example, if the thermal component 215 or the flange 405 were positioned far away from a center of gravity of the battery module 115 (e.g., proximate a topmost point of the first submodule 220 or a bottommost point of the second submodule 225), the battery module 115 may cause a substantial load or moment (e.g., cantilever) about the battery module 115, as the weight of the battery module 115 may be substantially uneven (e.g., more than 75% of the weight of the submodules is above the thermal component 215 or more than 75% of the weight of the submodules is below the thermal component 215). By coupling the battery module 115 at an approximate middle portion 230 of the battery module 115, such substantial load or moment can be substantially reduced or eliminated.

Figure 5:
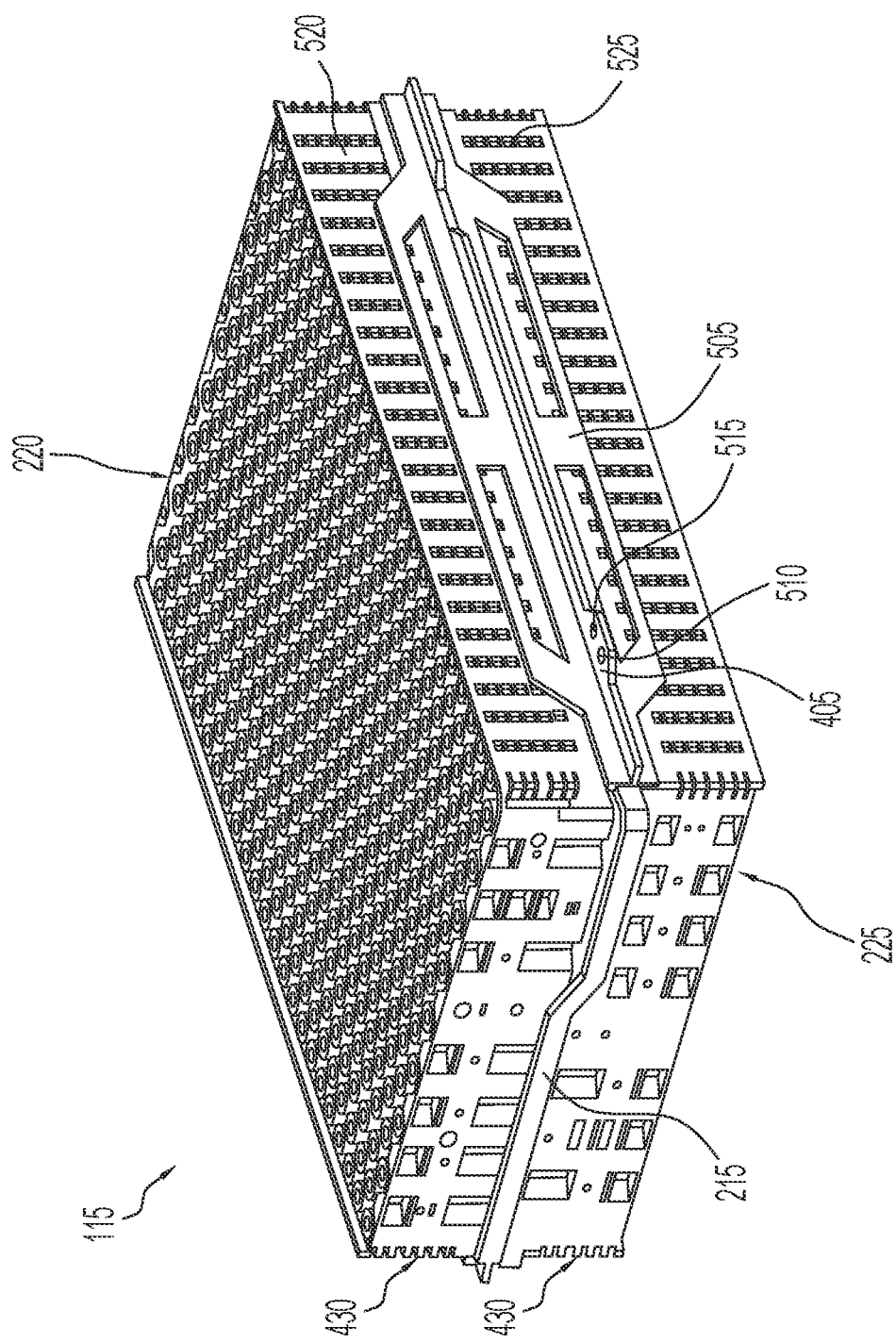
FIG. 5 depicts an example perspective view of a portion of the battery pack system of FIG. 3, in accordance with implementations.
Figure 6:
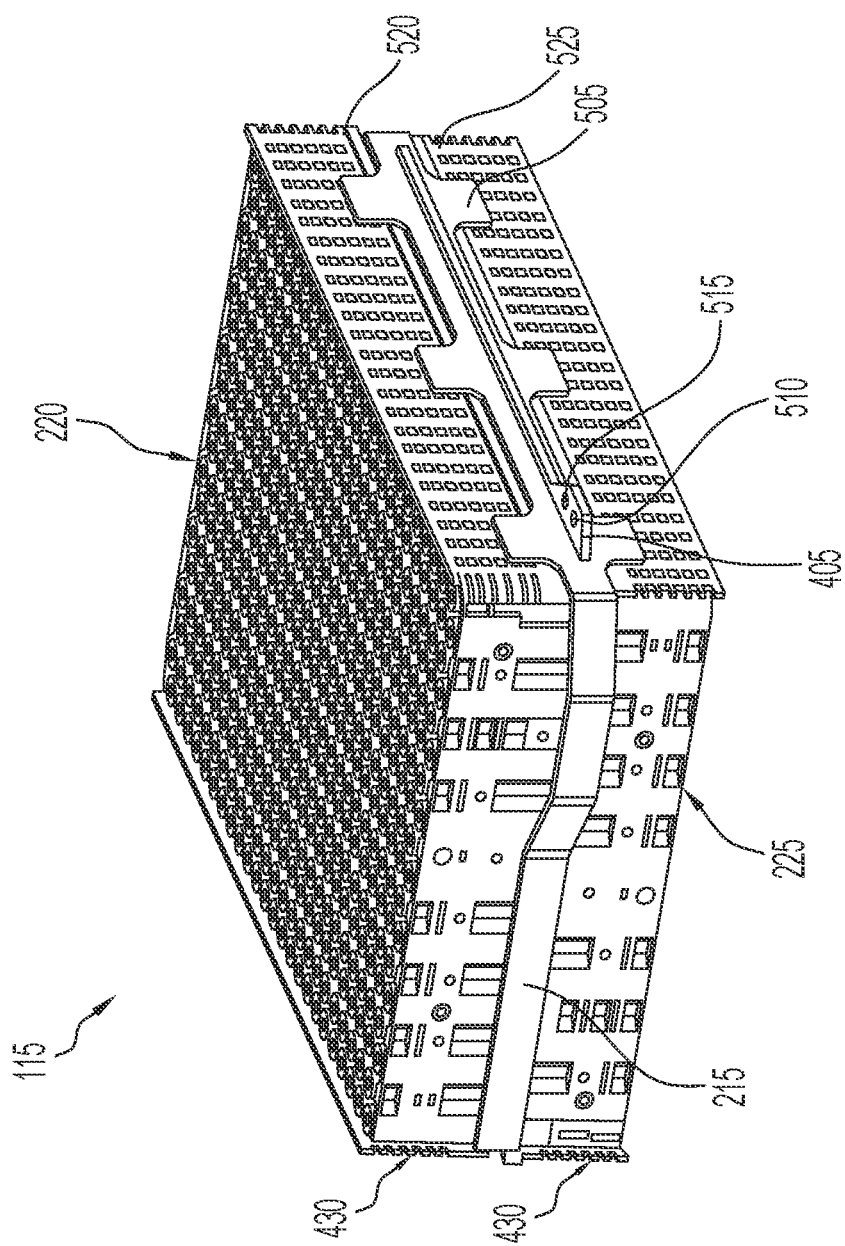
FIG. 6 depicts an example perspective view of a portion of the battery pack system of FIG. 3, in accordance with implementations.
Figure 7:
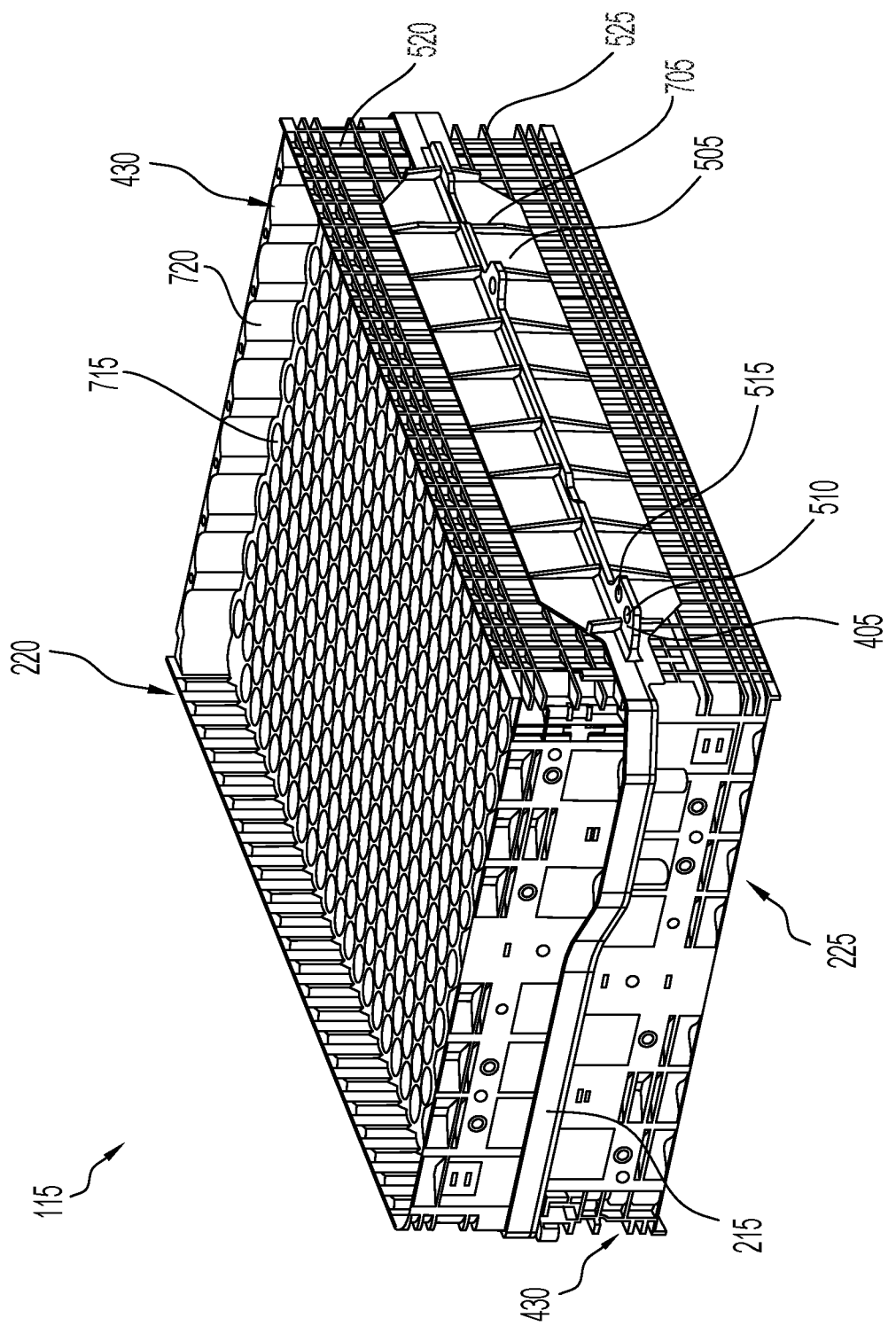
FIG. 7 depicts an example perspective view of a portion of the battery pack system of FIG. 3, in accordance with implementations.

FIGS. 5-7 depict example perspective views of a battery module 115 of the battery pack system 300. As described herein, each of the first submodule 220 and the second submodule 225 can be, can include, or can be formed by the exterior carrier 430 for one or more battery cells 120. For example, the exterior carrier 430 can include one or more holes 715 (e.g., through holes depicted in at least FIG. 7, which illustrates the exterior carrier 430 without battery cells 120 coupled for illustrative purposes only) that can each receive and store a battery cell 120. For example, each hole 715 of the exterior carrier 430 can include a depth to receive a lower portion of a battery cell 120 (e.g., a depth of a hole 715 can be about equal to or less than a length of a battery cell 120). The exterior carrier 430 can include one or more grooves 720 positioned along one or more side surfaces of the exterior carrier 430 to facilitate aligning each battery cell 120. The through holes 715 or the grooves 720 of the exterior carrier 430 can include various shapes (e.g., cylindrical, round, oblong, hexagonal, prismatic, pouch, or another shape) to receive each battery cell 120. The battery cells 120 can be coupled with the through holes using one or more adhesives. For example, adhesives can facilitate mounting each battery cell 120 to each hole 715 such that movement of the battery cells 120 relative to the holes 715 is limited.

One or more portions of the battery module 115, such as the thermal component 215, can include at least one structure to facilitate maintaining the first submodule 220 or the second submodule 225 in position. For example, the thermal component 215 can include at least one flange extension 505 that extends at an angle from the flange 405 such that the flange extension 505 abuts a side portion of the first submodule 220 or the second submodule 225 (e.g., first side wall/surface 520 or second side wall/surface 525). For example, at least a portion of the flange extension 505 can extend perpendicular to the flange 405 to support (e.g., abut, contact, position adjacent to, maintain a position of) a portion of the battery module 115, such as a portion of the exterior carrier 430. The flange extension 505 can be or can include one or more supports, brackets, walls, flanges, cages, or other components that extend from the thermal component 215 (e.g., from the flange 405 of the thermal component 215) to support (e.g., contact, abut, facilitate maintaining the position of, position next to) the first submodule 220 or the second submodule 225.

The flange extension 505 can be monolithically (e.g., integrally, continuously) formed with the thermal component 215 such that the thermal component 215, the flange 405, or the flange extension 505 form one continuous structure. For example, the flange extension 505 can be formed with the thermal component 215 via casting. By forming a continuous structure, the thermal component 215, the flange 405, and the flange extension 505 can facilitate improving structural efficiency of the thermal component 215 and reducing overall assembly complexity (e.g., in comparison to multiple distinct components that may require addition assembly). The flange extension 505 can couple with the thermal component 215 in a variety of other ways. For example, the flange extension 505 can be formed with the thermal component 215 by one or more welded joints, fasteners, adhesives, or other techniques.

The flange extension 505 can extend at least partially along a side portion of the first submodule 220 or the second submodule 225 (e.g., at least partially along first side wall/surface 520 or second side wall/surface 525). For example, the flange extension 505 can extend along a portion of the side of the battery module 115 in a vertical direction (e.g., perpendicular to a length of the thermal component 215) or in a horizontal direction (e.g., parallel to a length the thermal component 215). The flange extension 505 can directly abut (e.g., contact) at least a portion of the side of the battery module 115, for example. The flange extension 505 can include one or more components coupled together. The flange extension 505 can include one continuous component, as another example. The flange extension 505 can include one or more apertures, openings, slots, or other features that can define or form a portion of the flange extension 505.

The flange extension 505 can couple with the thermal component 215 such that the flange extension 505 can facilitate cooling one or more side walls of the battery module 115 (e.g., side wall 520 or side wall 525). For example, the thermal component 215 (e.g., the cold plate) can extend to the side wall 520, 525 of the battery module 115 and can extend vertically along the side walls 520, 525 of the battery module 115 by the flange extension 505 such that the thermal effects of the thermal component 215 can facilitate cooling the sides walls 520, 525 of the battery module 115 (e.g., by conduction, convection, radiation, a fluid line, or other cooling or warming process).

The flange extension 505 can extend along various portions of the first submodule 220 or the second submodule 225. For example, the flange extension 505 can extend along a majority of the side of the first submodule 220 or the second submodule 225 (e.g., 60% of the first submodule 220 or the second submodule 225, 75% of the first submodule 220 or the second submodule 225, more than 75% of the first submodule 220 or the second submodule 225, or another portion). The flange extension 505 can extend along about half of the side of the first submodule 220 or the second submodule 225 (e.g., about 50% of the first submodule 220 or the second submodule 225). The flange extension 505 can extend along a portion of the first submodule 220 or the second submodule 225 (e.g., about 5% of the first submodule 220 or the second submodule 225, about 15% of the first submodule 220 or the second submodule 225, more than 15% of the first submodule 220 or the second submodule 225, or another portion).

The flange extension 505 can include a plurality of ribs 705 coupled with the flange extension 505. For example, the ribs 705 can be monolithically formed with the flange extension 505. The ribs 705 can be coupled with the flange extension 505 in a variety of other ways including, but not limited to, welding, fasteners, adhesives, or other techniques. The ribs 705 can extend from the flange 405. For example, the ribs 705 can each extend along the flange extension 505 between one or more portions of the flange 405 and another portion of the flange extension 505 (e.g., such that the ribs 705 extend at an angle relative to a surface of the flange 405). For example, the ribs 705 can be substantially triangular in shape. The ribs 705 can be a variety of other shapes including, but not limited to, square, rounded, or another shape. The ribs 705 can facilitate providing support for the side walls/surfaces 520, 525 of the battery module 115. For example, the ribs 705 can facilitate providing strength for the flange extension 505 to support the battery module 115. The ribs 705 can facilitate aligning or mounting the battery module 115 with the first cross member 310 or second cross member 315, as another example. For example, the ribs 705 can facilitate reducing relative movement between one or more components of the battery module 115 (e.g., between the first submodule 220, the second submodule 225, or the thermal component 215).

The flange 405 or the flange extension 505 can include one or more apertures. For example, the flange 405 can include a first aperture 510 or a second aperture 515. At least one of the first aperture 510 or the second aperture 515 can receive the fastener 410 as described herein. For example, the second aperture 515 (e.g., the fastener hole) can receive the fastener 410 to facilitate coupling the thermal component 215 with the first cross member 310 and the second cross member 315.

Figure 9:
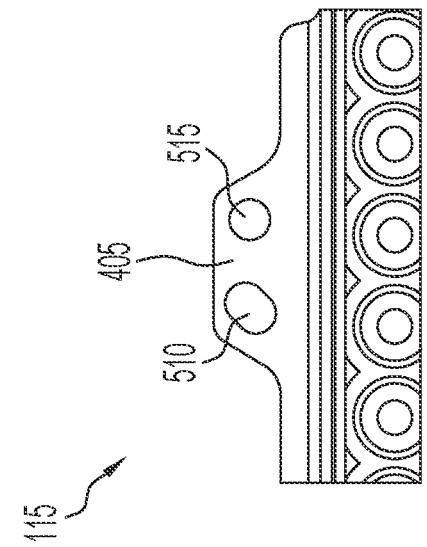
FIG. 9 depicts an example top view of a portion of the battery pack system of FIG. 3, in accordance with implementations.
Figure 8:
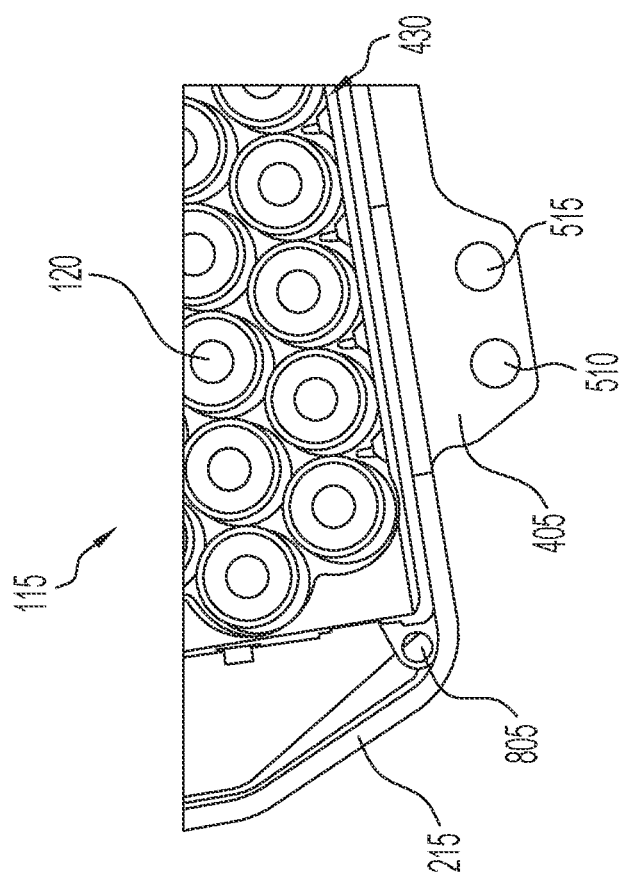
FIG. 8 depicts an example top view of a portion of the battery pack system of FIG. 3, in accordance with implementations.

FIG. 8 and FIG. 9 depict example top views of a portion of the battery module 115. The battery module 115 can include at least one third aperture 805 located, for example, at a portion of the first submodule 220, the second submodule 225, or the thermal component 215. At least one of the first aperture 510, the second aperture 515, or the third aperture 805 can facilitate locating a feature of the battery module 115 or another component of the battery pack system 300. For example, the first aperture 510, the second aperture 515, or the third aperture 805 can facilitate positioning one submodule (e.g., the first submodule 220) relative to another submodule (e.g., the second submodule 225). For example, the third aperture 805 can be or can include a through hole of the first submodule 220 that can align with a corresponding third aperture 805 (e.g., a through hole) of the second submodule 225 such that alignment of the third aperture 805 of the first submodule 220 with the third aperture 805 of the second submodule 225 can indicate that the first submodule 220 and the second submodule 225 are substantially aligned with one another (e.g., located at the same position relative to one another). The thermal component 215 can include one or more apertures corresponding to the third aperture 805 such that the third aperture 805 of the second submodule 225 is visible through the third aperture 805 of the first submodule 220 even when the first submodule 220 or the second submodule 225 is coupled with the thermal component 215.

At least one of the first aperture 510, the second aperture 515, or the third aperture 805 can include an oblong shape (e.g., a slot) such that any fastener 410 received by the aperture can move relative to the aperture in at least one direction. For example, FIG. 9 depicts an example of the first aperture 510 having an oblong shape (e.g., a slot). The first aperture 510 can include at least one dimension (e.g., a length of the slot) that is greater than the diameter of the second aperture 515, for example, such that a fastener 410 that is less than or equal to the second aperture 515 in size can move about the length of the first aperture 510. The first aperture 510 (e.g., the locating hole) can facilitate locating a feature. For example, the first aperture 510 can facilitate positioning one submodule (e.g., the first submodule 220) relative to another submodule (e.g., the second submodule 225). As another example, the first aperture 510 can facilitate positioning the battery module 115 relative to another portion of the vehicle 105, such as the first cross member 310, the second cross member 315, or a portion of the battery pack 110. For example, the first aperture 510 can be a datum for aligning or coupling the flange 405 with the battery pack 110. The first aperture 510 may not receive a fastener 410 such that the first aperture 510 remains a through hole to be used as a datum feature.

Figure 10:
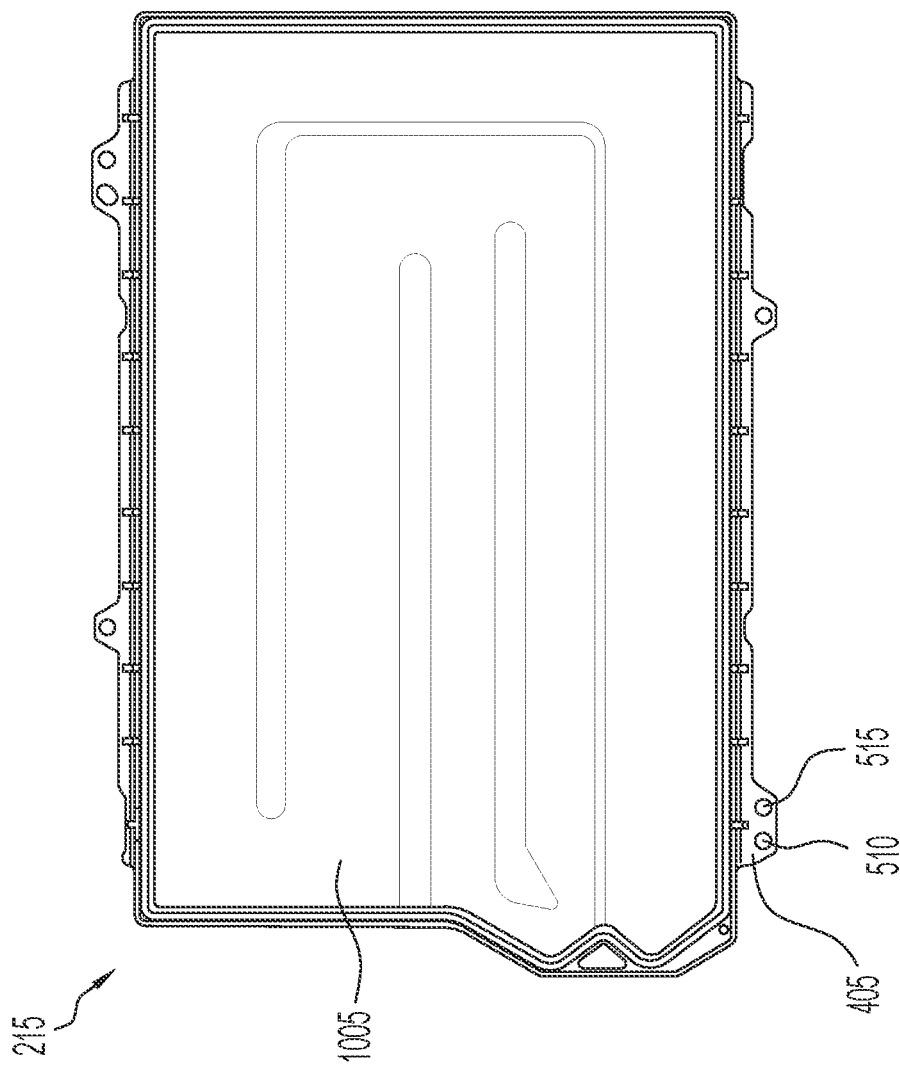
FIG. 10 depicts an example top view of a thermal component, in accordance with implementations.

FIG. 10 depicts an example top view of the thermal component 215. The thermal component 215 can include at least one flow path 1005. For example, the flow path 1005 can be or can include a channel, groove, aperture, opening, space, divot, or other component along a top surface of the thermal component 215 that allows a fluid to flow through (e.g., a coolant). For example, the flow path 1005 can include a serpentine counter flow pattern that allows free flow of a fluid. The thermal component 215 can include one or more protrusions, walls, partitions, barriers, extensions, dividers, or other components (depicted in at least FIG. 12) that at least partially define the flow path 1005 and facilitate directing a flow of fluid (e.g., coolant) through the flow path 1005. At least a portion of the first submodule 220 described herein can engage with the flow path 1005. For example, a bottom end surface of the first submodule 220 can cover (e.g., place on top of) the flow path 1005 such that fluid flowing through the flow path 1005 can flow beneath the first submodule 220.

Figure 11:
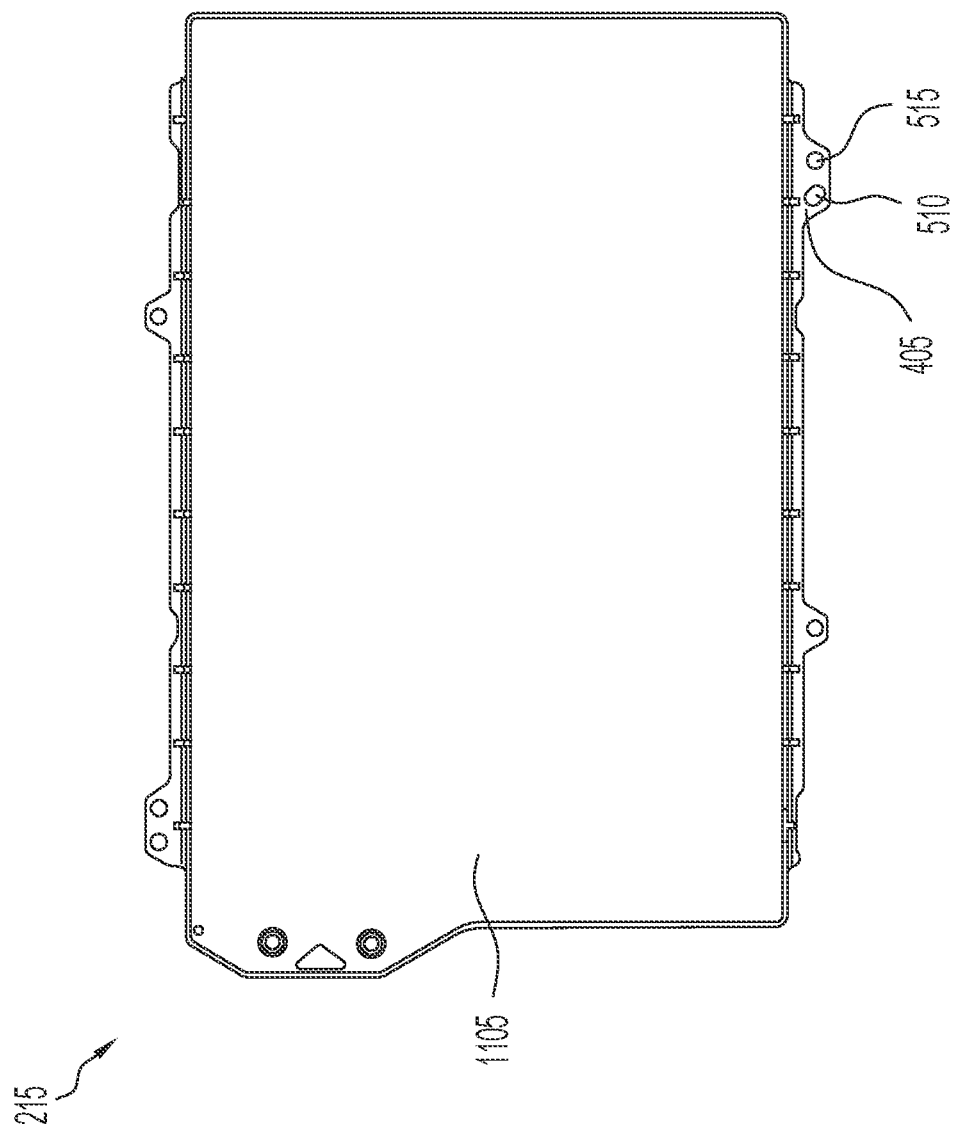
FIG. 11 depicts an example bottom view of the thermal component of FIG. 10, in accordance with implementations.

FIG. 11 depicts an example bottom view of the thermal component 215. The thermal component 215 can include at least one bottom surface 1105 that opposes the flow path 1005. For example, the bottom surface 1105 can define a bottom end portion of the flow path 1005 or of the thermal component 215. The bottom surface 1105 can be substantially smooth or flat (e.g., without any grooves or partitions). At least a portion of the second submodule 225 described herein can engage with the bottom surface 1105. For example, a top end surface of the second submodule 225 can abut (e.g., be disposed beneath) the bottom surface 1105. The flow path 1005 and the bottom surface 1105 can be disposed in the middle portion 230 of the battery module 115, for example.

Figure 12:
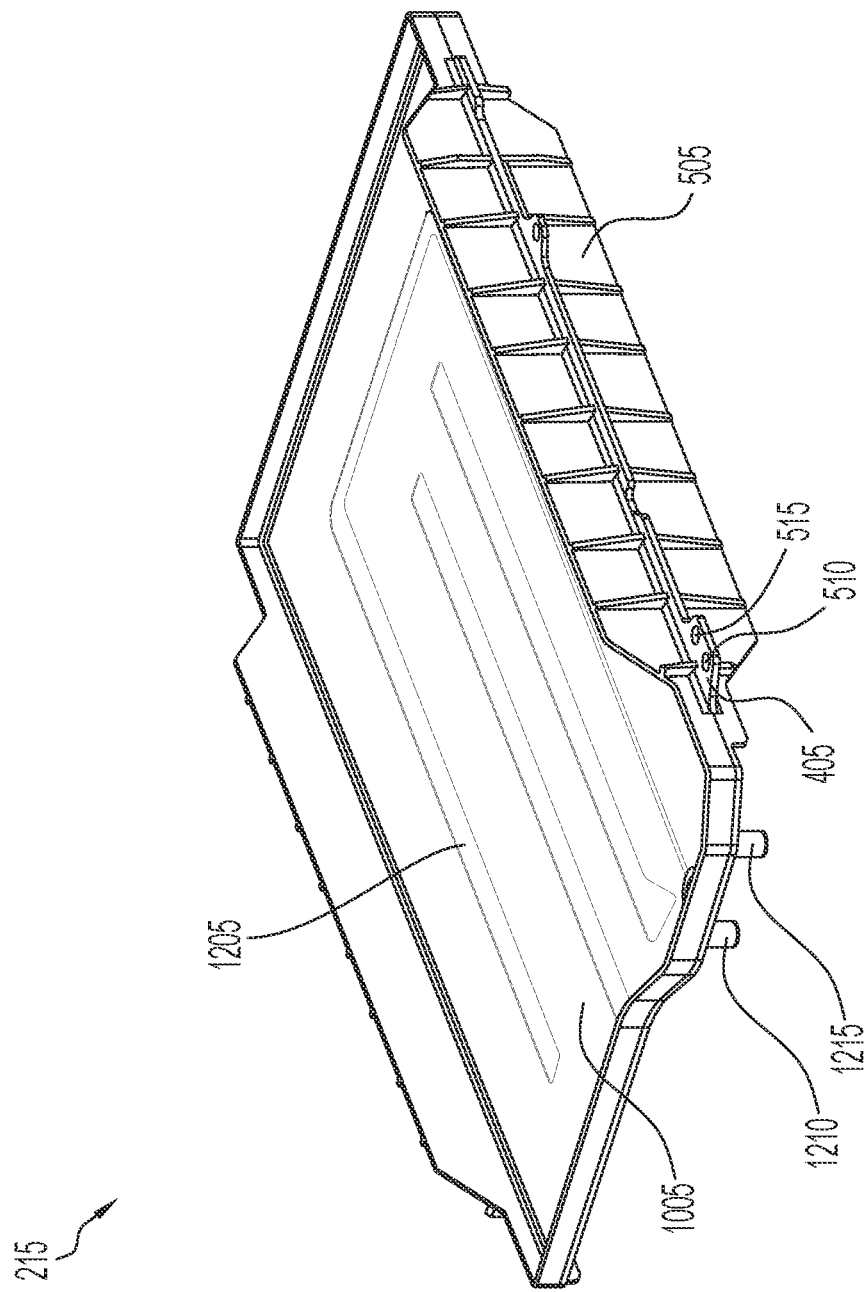
FIG. 12 depicts an example perspective view of the thermal component of FIG. 10, in accordance with implementations.

FIG. 12 depicts an example perspective view of the thermal component 215. As described herein, the thermal component 215 can include at least one protrusion 1205 that extends from a surface of the thermal component 215 (e.g., in a vertical direction, a raised surface) to at least partially define the flow path 1005. The thermal component 215 can include at least one inlet 1210 and at least one outlet 1215. For example, fluid (e.g., a coolant) can flow through the inlet 1210, follow the flow path 1005 defined by the protrusion 1205, and enter the outlet 1215. The fluid through the flow path 1005 can facilitate regulating a temperature of a nearby battery cell 120 (e.g., within the first submodule 220 or the second submodule 225 that are disposed above or below the thermal component 215).

Figure 13:
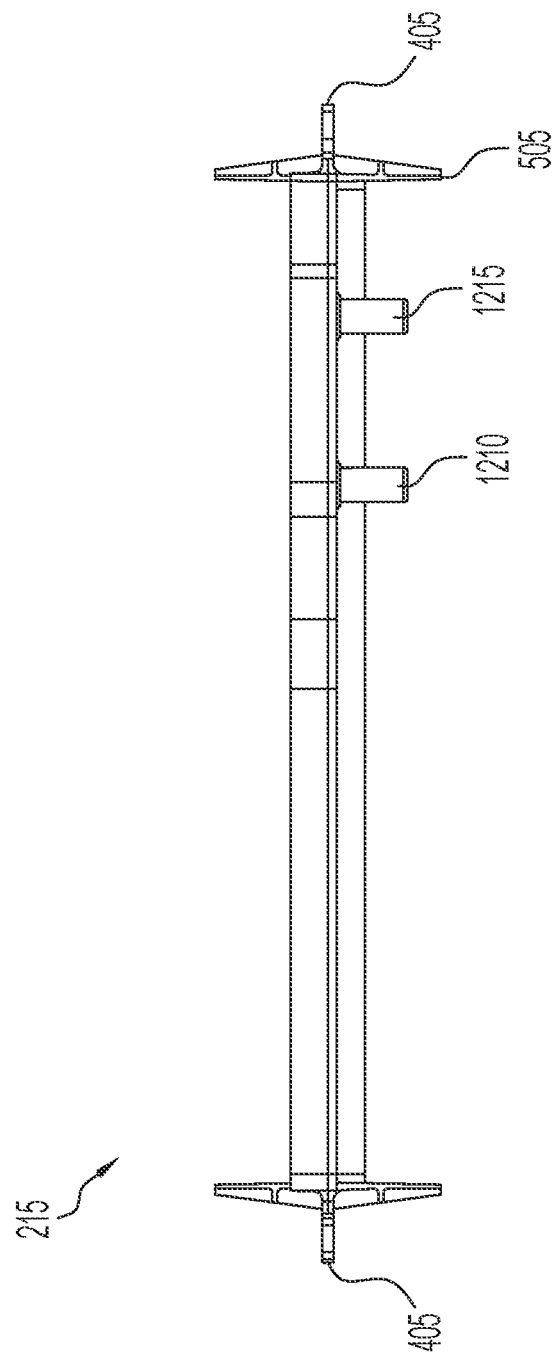
FIG. 13 depicts an example front view of the thermal component of FIG. 10, in accordance with implementations.
Figure 15:
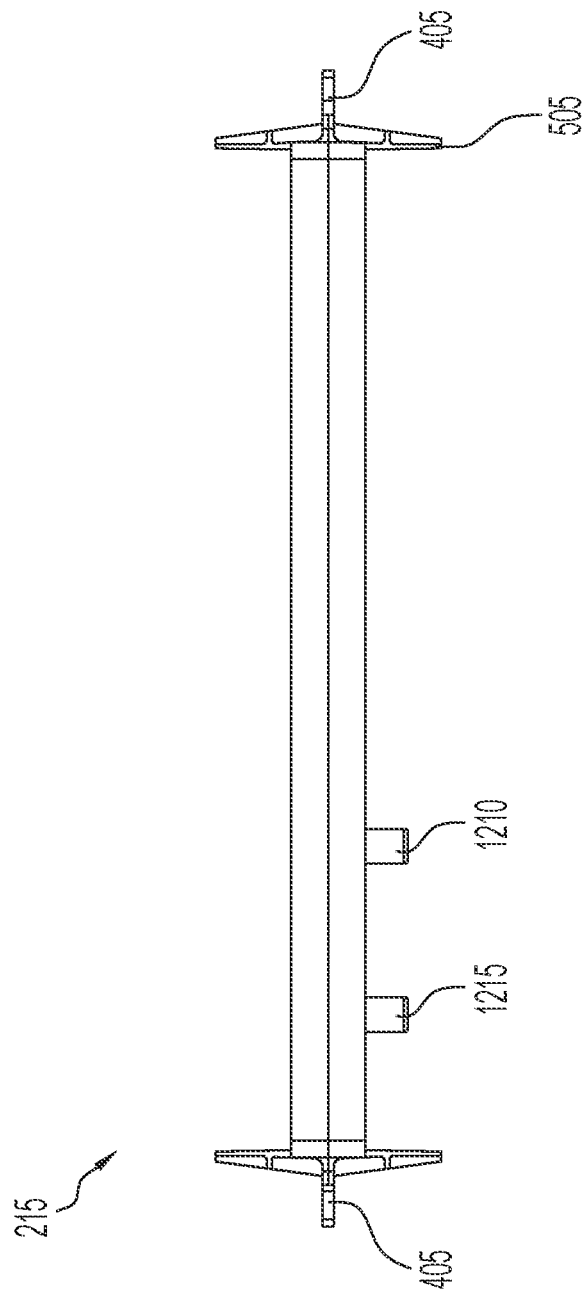
FIG. 15 depicts an example rear view of the thermal component of FIG. 10, in accordance with implementations.

FIG. 13 depicts an example front view of the thermal component 215 and FIG. 15 depicts an example rear view of the thermal component 215. The inlet 1210 or the outlet 1215 can protrude from the thermal component 215 (e.g., extend beyond a surface of the thermal component 215). The inlet 1210 or the outlet 1215 can extend substantially parallel to the flange extension 505, for example. The inlet 1210 or the outlet 1215 can be or can include one or more conduits, pipes, channels, or other components that allow fluid to flow through the inlet 1210 and the outlet 1215 to flow through the flow path 1005. As described herein, the thermal component 215 can include two flanges 405 that substantially oppose each other and each positioned along a respective side of the thermal component 215.

Figure 14:
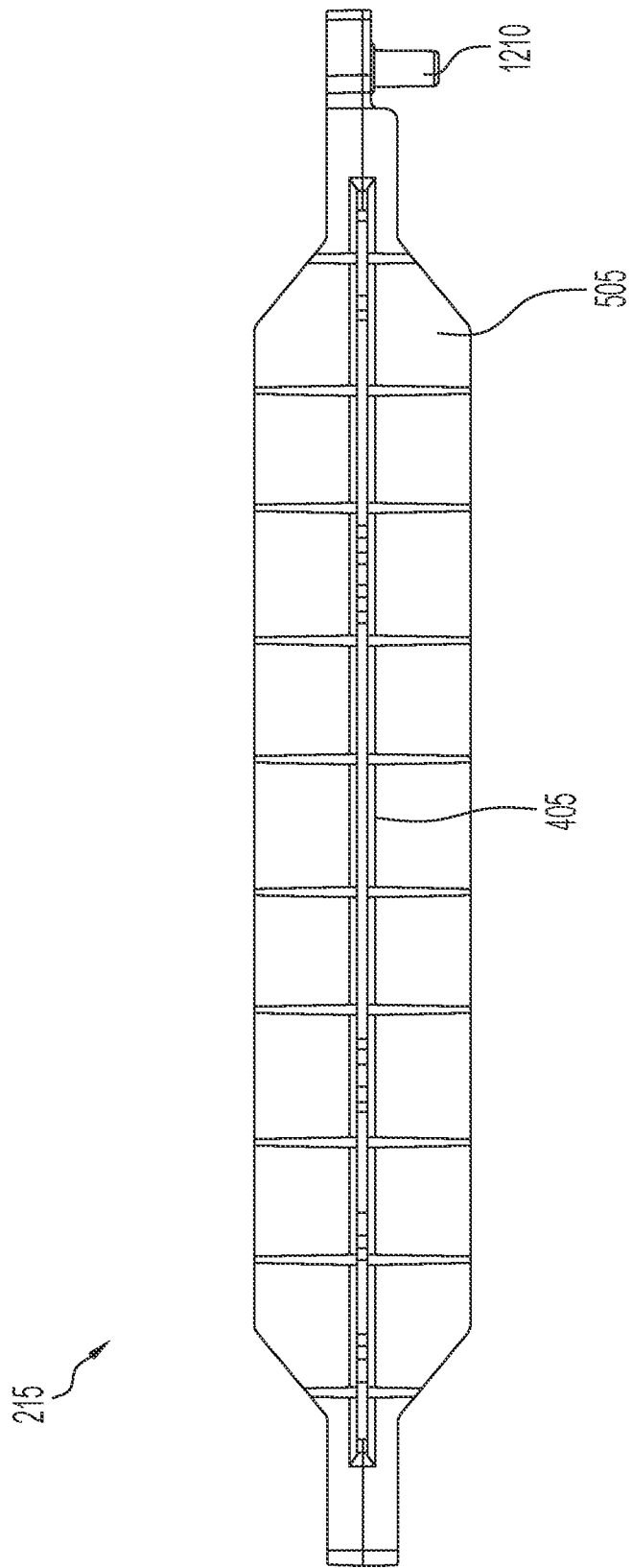
FIG. 14 depicts an example side view of the thermal component of FIG. 10, in accordance with implementations.
Figure 16:
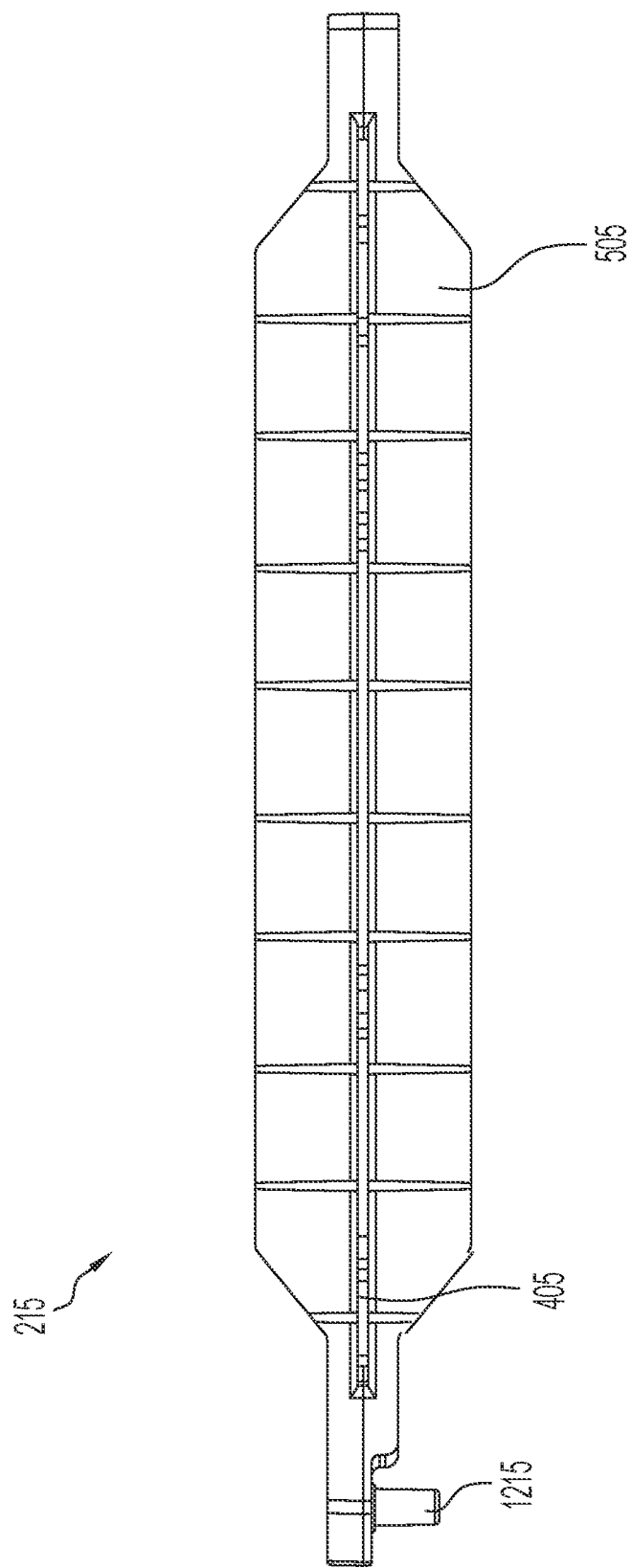
FIG. 16 depicts another example side view of the thermal component of FIG. 10, in accordance with implementations.

FIG. 14 and FIG. 16 depict example side views of the thermal component 215. As described herein, the flange extension 505 can extend at an angle relative to the flange 405 such that the at least a portion of the flange extension 505 extends beyond a portion of the thermal component 215 (e.g., beyond the flow path 1005 or beyond the bottom surface 1105).

Figure 17:
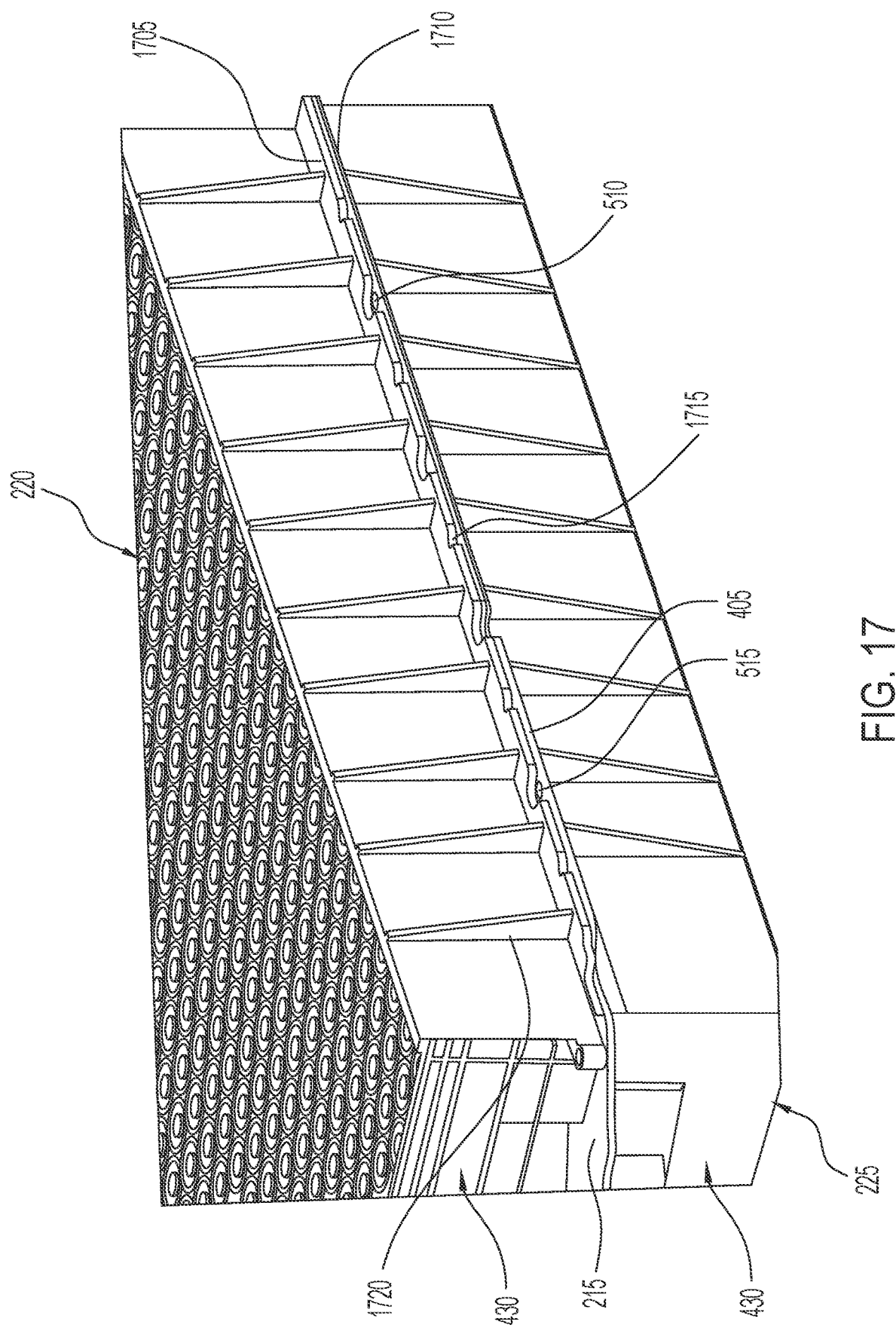
FIG. 17 depicts an example perspective view of a portion of the battery pack system of FIG. 3, in accordance with implementations.
Figure 18:
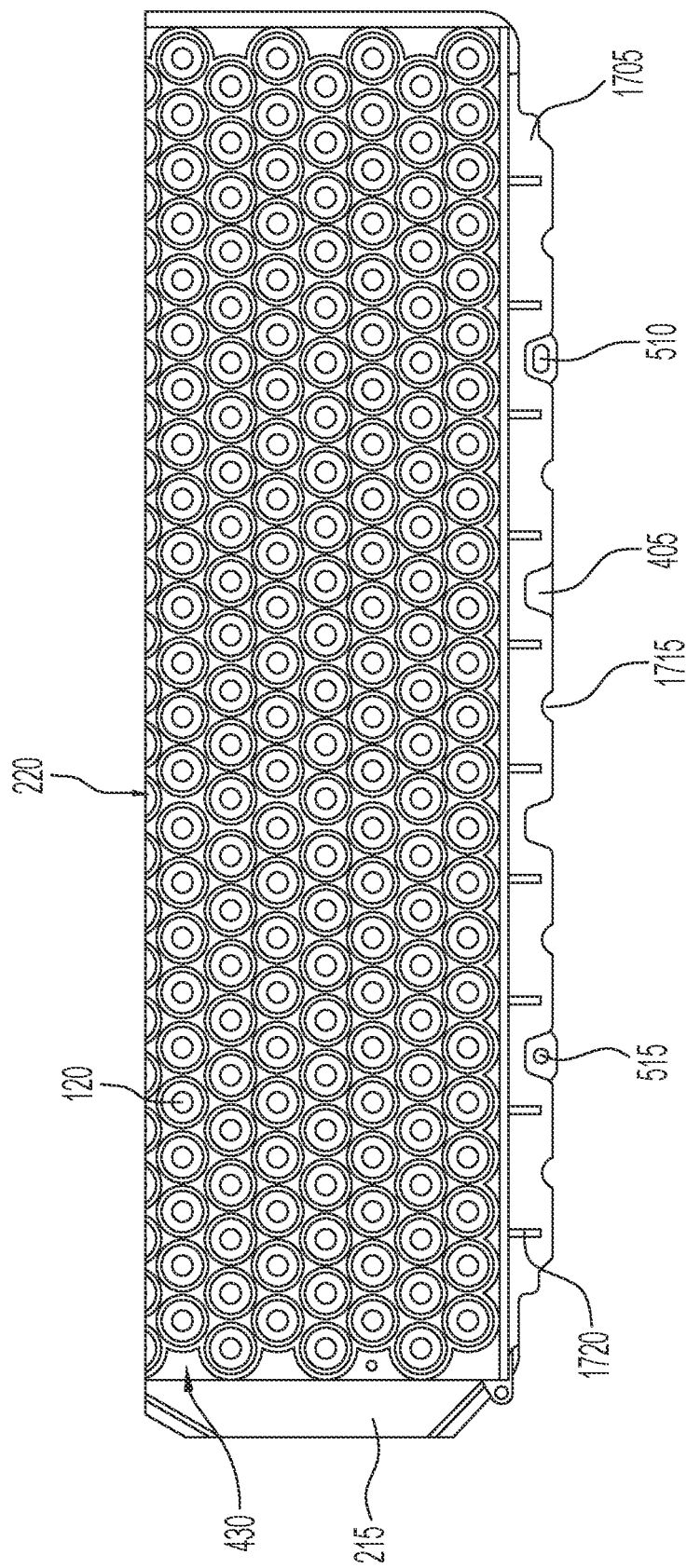
FIG. 18 depicts an example top view of a portion of the battery pack system of FIG. 3, in accordance with implementations.

FIG. 17 depicts an example perspective view of a portion of the battery module 115 and a portion of the apparatus 305 (e.g., a portion of the thermal component 215) and FIG. 18 depicts an example top view of a portion of the battery module 115 and a portion of the thermal component 215 coupled with the battery module 115. As depicted in FIGS. 17 and 18, and among others, the exterior carrier 430 of the battery module 115 can include one or more flanges that can engage with (e.g., contact, abut, position adjacent to) the flange 405 of the thermal component 215. For example, the exterior carrier 430 of the first submodule 220 can include a first tote flange (e.g., first tote flange 1705) and the exterior carrier 430 of the second submodule 225 can include a second tote flange (e.g., second tote flange 1710). The first tote flange 1705 and the second tote flange 1710 can be the same shape or size, or the first tote flange 1705 and the second tote flange 1710 can differ in shape or size. As described herein, at least a portion of the thermal component 215 (e.g., the flange 405 of the thermal component 215) can be disposed between the first tote flange 1705 and the second tote flange 1710.

Figure 19:
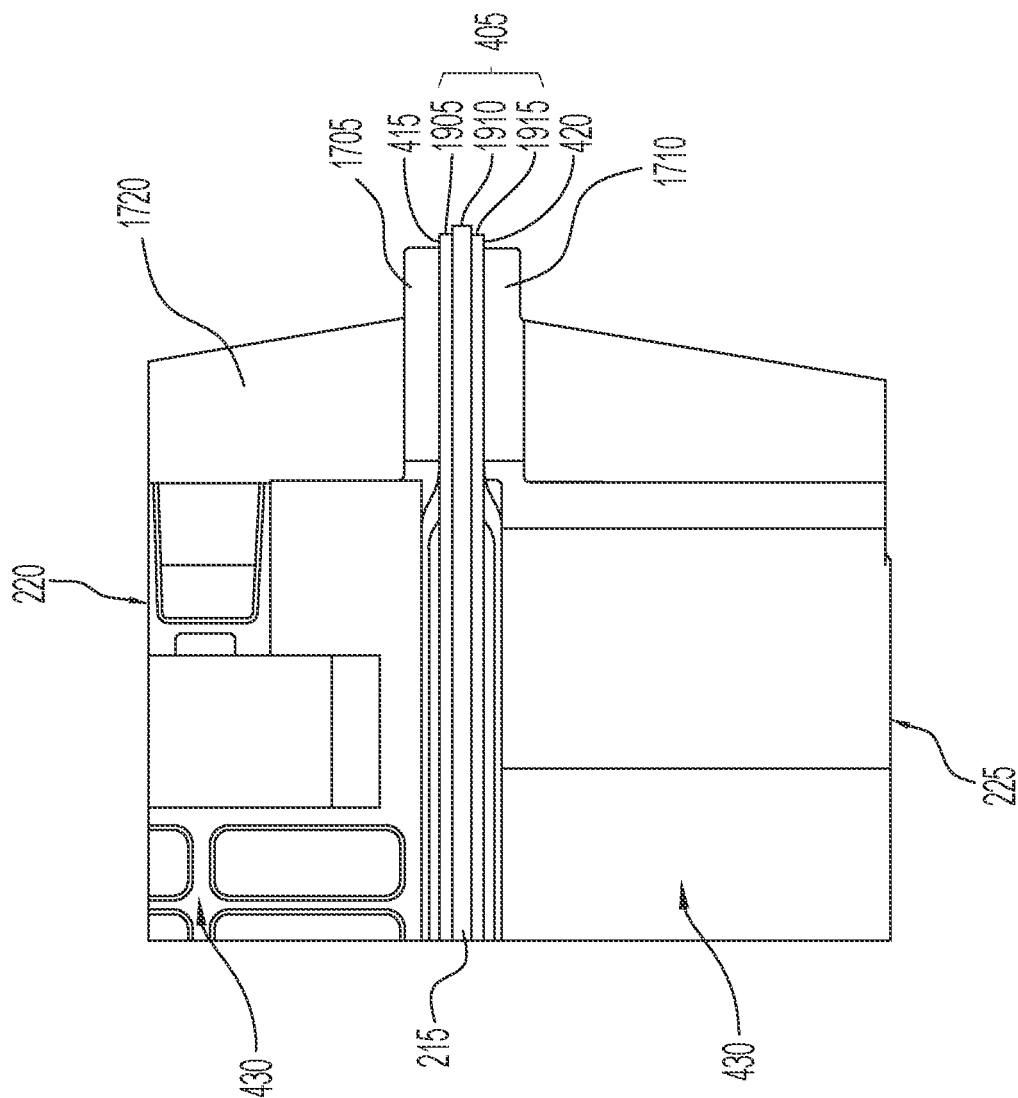
FIG. 19 depicts an example front view of a portion of the battery pack system of FIG. 3, in accordance with implementations.

FIG. 19 depicts an example front view of a portion of the battery module 115 and a portion of the thermal component 215. The first tote flange 1705 can engage with the first side 415 of the flange 405 and the second tote flange 1710 can engage with the opposing second side 420 of the flange 405. For example, the flange 405 can include one or more portions (e.g., one or more flanges that couple with one another by contacting one another) to form the flange 405. The flange 405 can include a first portion 1905, a second portion 1910, or a third portion 1915. The first side 415 of the flange 405 can be or can include a topmost portion of the first portion 1905 that can contact the first tote flange 1705 of the exterior carrier 430 of the first submodule 220. The second side 420 of the flange 405 can be or can include a bottommost portion of the third portion 1915 that can contact the second tote flange 1710 of the exterior carrier 430 of the second submodule 225. The second portion 1910 of the flange 405 can be disposed between the first portion 1905 and the third portion 1915. For example, the first portion 1905 and the third portion 1915 can be or can include surfaces that at least partially contact, surround, abut, or connect with a middle surface (e.g., the second portion 1910). The first portion 1905, the second portion 1910, and the third portion 1915 of the flange 405 can each be clamped together (e.g., between the first tote flange 1705 and the second tote flange 1710) by one or more fasteners or clamps described herein.

The first tote flange 1705 or the second tote flange 1710 can facilitate clamping the flange 405 of the thermal component 215 such that movement between one or more components of the battery module 115 can be limited. For example, the first tote flange 1705 or the second tote flange 1710 of the exterior carriers 430 coupled with the flange 405 of the thermal component 215 can reduce movement (e.g., lateral movement, longitudinal movement, rotational movement, or other movements) between the first submodule 220 or the second submodule 225 relative to the thermal component 215. The first tote flange 1705 or the second tote flange 1710 can facilitate reducing movement between the first submodule 220 and the thermal component 215 relative to the second submodule 225. For example, clamping the flange 405 between the first tote flange 1705 and the second tote flange 1710 can facilitate maintaining the first submodule 220, the second submodule 225, or the thermal component 215 in position relative to each other such that additional supports (e.g., sheer walls) may not be necessary to reduce relative movement between the components of the battery module 115.

Figure 20:
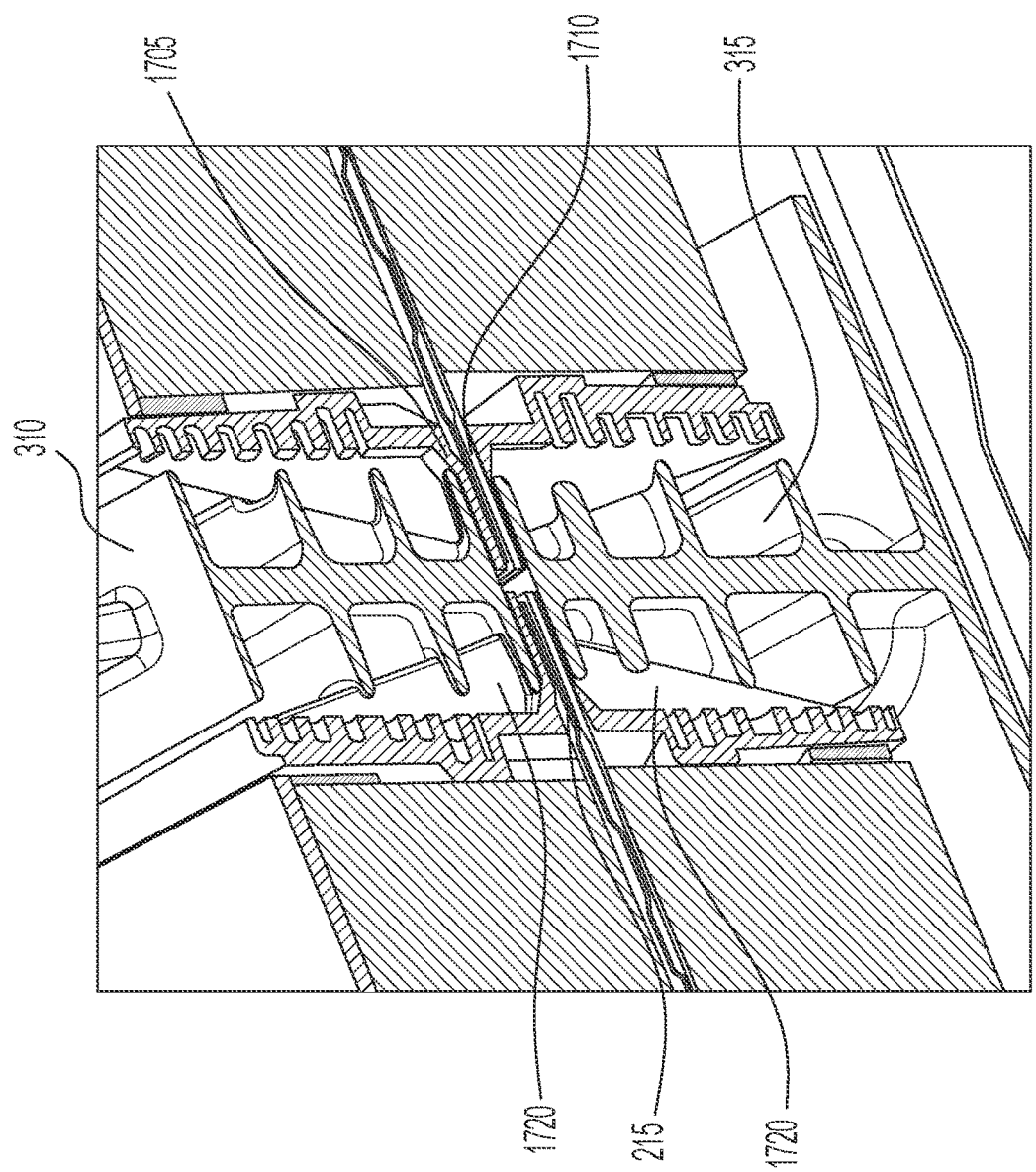
FIG. 20 depicts an example perspective view of a portion of the battery pack system of FIG. 3, in accordance with implementations.

The exterior carriers 430 of the first submodule 220 and the second submodule 225 can compress one or more portions of the flange 405. For example, as depicted in at least FIGS. 17-19, the flange 405 of the thermal component 215 can couple with the exterior carriers 430 such that the flange 405 is disposed between the first tote flange 1705 and the second tote flange 1710. The first tote flange 1705, the second tote flange 1710, and the flange 405 can each include at least one divot that each align with one another (e.g., to form one divot 1715 that extends from the first tote flange 1705 through the second tote flange 1710). For example, the first tote flange 1705, the second tote flange 1710, and the flange 405 can each include a plurality of divots that each align with one another to form a plurality of through divots 1715. At least one of the through divots 1715 can at least partially receive a fastener 410 to facilitate coupling the first tote flange 1705, the flange 405, and the second tote flange 1710 with the first cross member 310 and the second cross member 315, as depicted in at least FIG. 20, and facilitate clamping the first portion 1905, the second portion 1910, and the third portion 1915 of the flange 405 together. The first portion 1905, the second portion 1910, and the third portion 1915 of the flange 405 can couple by one or more adhesives or welds in addition or alternatively to the fasteners 410.

The exterior carriers 430 and the thermal component 215 can include any amount of through divots 1715. For example, the exterior carriers 430 and the thermal component 215 can include five through divots 1715 such that the exterior carriers 430 at least partially receive five fasteners 410 (e.g., five screws, clamps, bolts, or other fasteners). It should be understood that the thermal component 215 can include two flanges 405 that can each include five divots 1715 protruding from opposing sides of the thermal component 215. One flange 405 is described for illustrative purposes. The exterior carriers 430 and the thermal component 215 can include more or less through divots 1715 (e.g., one, two, three, four, or more than five).

Each of the first tote flange 1705 and the second tote flange 1710 can extend about equal to or less than half way across a width of the first cross member 310 or the second cross member 315 (e.g., such that the flange 405 of the thermal component 215 does not cross a midpoint of the first cross member 310 or second cross member 315 when the thermal component 215 is coupled with the first cross member 310 or second cross member 315). For example, as depicted in at least FIG. 20, the first tote flange 1705 or the second tote flange 1710 of a first battery module 115 may not contact another first tote flange 1705 or second tote flange 1710 of a second battery module 115 positioned adjacent to the first battery module 115 when the first and second battery modules 115 are coupled with the first cross member 310 or with the second cross member 315 (e.g., a space may form between the flanges 405 of the thermal components 215 of two adjacent battery modules 115 when coupled with the battery pack 110).

At least one of the first aperture 510 or the second aperture 515 of the flange 405 can remain a through hole or slot (e.g., and not receive a fastener 410) to facilitate providing a locating feature (e.g., an alignment feature) between at least one of the exterior carrier 430 of the first submodule 220, the thermal component 215, the exterior carrier 430 of the second submodule 225, or a portion of the battery pack 110 (e.g., the first cross member 310 or the second cross member 315 when coupled with the battery pack 110).

The exterior carrier 430 of the first submodule 220 or the exterior carrier 430 of the second submodule 225 can include at least one rib 1720 that extends from the first tote flange 1705 or the second tote flange 1710. For example, the exterior carrier 430 of the first submodule 220 and the exterior carrier 430 of the second submodule 225 can include a plurality of ribs 1720 that respectively extend from the first tote flange 1705 and the second tote flange 1710. The plurality of ribs 1720 can facilitate providing support for the side walls 520, 525 of the battery module 115 and strengthening the exterior carriers 430. For example, the plurality of ribs 1720 can eliminate or reduce the need for sheer walls that attach to the side walls/surfaces 520, 525 of the battery module 115, thereby reducing the number of components and making the battery module 115 lighter to improve vehicle range. The plurality of ribs 1720 can facilitate coupling or aligning the battery module 115 with the first cross member 310 or the second cross member 315. For example, as depicted in at least FIG. 20, the plurality of ribs 1720 can engage with (e.g., contact, abut) one or more portions (e.g., corresponding grooves, divots, apertures, or other components) of the first cross member 310 or the second cross member 315 to facilitate aligning and coupling the exterior carriers 430 with the first cross member 310 and the second cross member 315. The ribs 1720 can extend from the exterior carriers 430 at an angle. For example, the ribs 1720 can be substantially triangular in shape, such that the ribs 1720 are thinner on the ends of the battery module 115 but thicker towards the middle portion 230 where they meet with the first tote flange 1705 and the second tote flange 1710 of the respective exterior carriers 430. The ribs 1720 can be a variety of other shapes including, but not limited to, square, rounded, or another shape.

Figure 21:
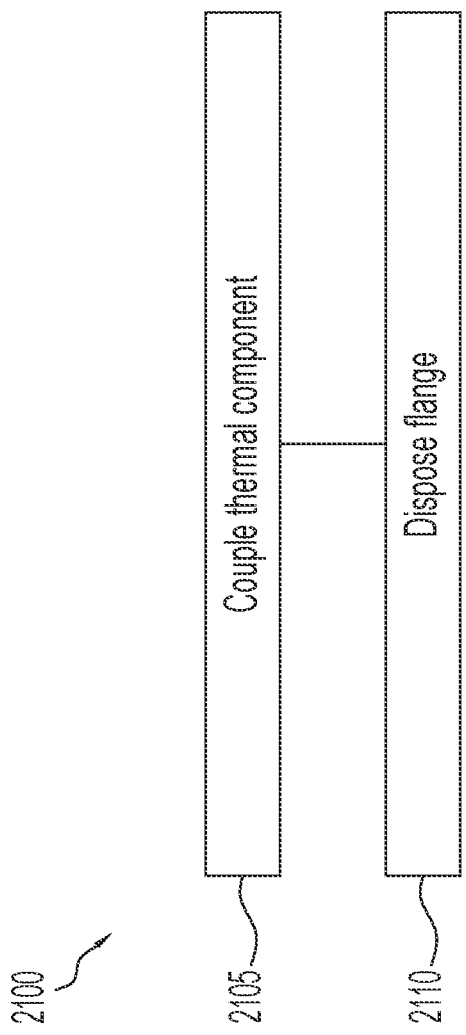
FIG. 21 depicts an example illustration of a method, in accordance with implementations.

FIG. 21 depicts an illustration of a method 2100. The method 2100 can include coupling the thermal component 215, as depicted in act 2105. For example, the thermal component 215 can couple with the battery module 115. For example, the thermal component 215 can be positioned between a surface of the first submodule 220 (e.g., a surface that opposes the flow path 1005 of the thermal component 215) and a surface of the second submodule 225 (e.g., a surface that opposes the bottom surface 1105 of the thermal component 215) such that the thermal component 215 couples with the middle portion 230 of the battery module 115 (e.g., the middle portion 230 is between the first submodule 220 and the second submodule 225, the middle portion 230 is at an approximate center portion of the battery module 115 which includes the first submodule 220 and the second submodule 225, the middle portion 230 of the battery module 115 is generally positioned away from a topmost portion or bottommost portion of the battery module 115). The thermal component 215 can couple with the battery module 115 through various means. For example, the thermal component 215 can couple with one or more portions of the exterior carriers 430 of the battery module 115. The thermal component 215 can couple with the exterior carriers 430 by one or more adhesives, fasteners, welds, or other techniques.

The method 2100 can include disposing the flange 405, as depicted in act 2110. For example, the flange 405 can extend from and beyond a side portion of the thermal component 215 (e.g., extending at least partially past side walls/surfaces 520 and 525 in a horizontal direction). The flange 405 can be monolithically formed with the thermal component 215. For example, the flange 405 can be continuously formed with the thermal component 215 during manufacturing of the thermal component 215 (e.g., via casting). The flange 405 can include one or more separate components that couple with the thermal component 215 by one or more fasteners, adhesives, welds, or other techniques, as another example. The flange 405 can include a first side 415 and an opposing second side 420.

The flange 405 can engage with the first cross member 310 or the second cross member 315. For example, the first side 415 of the flange 405 can receive (e.g., contact, abut, engage with, position proximate to) a portion of the first cross member 310 and the second side 420 of the flange 405 can receive (e.g., contact, abut, engage with, position proximate to) a portion of the second cross member 315. The first side 415 of the flange 405 can receive (e.g., contact, abut, engage with, position proximate to) a portion of the first tote flange 1705 of an exterior carrier 430 of the first submodule 220 and the second side 420 of the flange 405 can receive (e.g., contact, abut, engage with, position proximate to) a portion of the second tote flange 1710 of an exterior carrier 430 of the second submodule 225, as another example. The flange 405 can include at least one aperture (e.g., second aperture 515) or at least one divot (e.g., divot 1715) that at least partially receive a fastener 410 (e.g., bolt, screw, clamp, or other fastener) to facilitate coupling the thermal component 215 with the first cross member 310 or second cross member 315. The flange 405 can be disposed at the middle portion 230 of the battery module 115 such that the battery module 115 is coupled with the first cross member 310 and the second cross member 315 approximately about the center of gravity 425 of the battery module 115.

FIG. 22 depicts an illustration of a method 2200. The method 2200 can include providing the apparatus 305, as depicted in act 2205. For example, the apparatus 305 can include the thermal component 215. The thermal component 215 can couple with a middle portion 230 of the battery module 115. For example, the thermal component 215 can couple with the exterior carrier 430 of the first submodule 220 and to the exterior carrier 430 of the second submodule 225 at a position between a surface of the first submodule 220 (e.g., a surface that opposes the flow path 1005 of the thermal component 215) and a surface of the second submodule 225 (e.g., a surface that opposes the bottom surface 1105 of the thermal component 215). For example, the middle portion 230 can be between the first submodule 220 and the second submodule 225, the middle portion 230 can be at an approximate center portion of the battery module 115 which includes the first submodule 220 and the second submodule 225, or the middle portion 230 of the battery module 115 can be generally positioned away from a topmost portion or bottommost portion of the battery module 115. The thermal component 215 can couple with a middle portion 230 of the battery module 115 such that the thermal component 215 is located approximate the center of gravity 425 of the battery module 115. For example, a portion of the thermal component 215 can extend through the center of gravity of the battery module 115. The thermal component 215 can couple with the battery module 115 through various means. For example, the thermal component 215 can couple with one or more portions of the exterior carriers 430 of the battery module 115. The thermal component 215 can couple with the exterior carriers 430 by one or more adhesives, fasteners, welds, or other techniques.

The thermal component 215 can include at least one flange 405. For example, the flange 405 can extend from a portion of the thermal component 215 (e.g., from each side). The flange 405 can be monolithically formed with the thermal component 215. For example, the flange 405 can be continuously formed with the thermal component 215 during manufacturing of the thermal component 215 (e.g., via casting). The flange 405 can include one or more separate components that couple with the thermal component 215 by one or more fasteners, adhesives, welds, or other techniques, as another example. The flange 405 can include a first side 415 and an opposing second side 420.

The thermal component 215 can couple with the first cross member 310 or the second cross member 315 by the flange 405. For example, the first side 415 of the flange 405 can receive (e.g., contact, abut, engage with, position proximate to) a portion of the first cross member 310 and the second side 420 of the flange 405 can receive (e.g., contact, abut, engage with, position proximate to) a portion of the second cross member 315. The first side 415 of the flange 405 can receive (e.g., contact, abut, engage with, position proximate to) a portion of the first tote flange 1705 of an exterior carrier 430 of the first submodule 220 and the second side 420 of the flange 405 can receive (e.g., contact, abut, engage with, position proximate to) a portion of the second tote flange 1710 of an exterior carrier 430 of the second submodule 225, as another example.

The flange 405 can include at least one aperture. For example, the flange 405 can include the first aperture 510 and the second aperture 515. At least one of the first aperture 510 or the second aperture 515 can receive a portion of a fastener 410 to facilitate coupling the flange 405 with the first cross member 310 or the second cross member 315. At least one of the first aperture 510 or the second aperture 515 can remain a through hole (e.g., may not receive a fastener 410) to facilitate locating one or more portions of the battery module 115 relative to one another (e.g., the first aperture 510 or the second aperture 515 can be or can include an alignment feature, such as a datum, between the first submodule 220 and the second submodule 225).

The exterior carrier 430 of the first submodule 220 and the exterior carrier 430 of the second submodule 225 can at least partially enclose the flange 405 (e.g., by the first tote flange 1705 and the second tote flange 1710). The first tote flange 1705 (e.g., the first tote flange), the second tote flange 1710 (e.g., the second tote flange), and the flange 405 can each include a plurality of divots (e.g., grooves, openings, spaces) that align with one another to form a plurality of through divots 1715. At least one through divot 1715 can receive a fastener to facilitate coupling the first tote flange 1705, the second tote flange 1710, and the flange 405 with the first cross member 310 or the second cross member 315.

The thermal component 215 can include one or more flange extensions 505 that extend at an angle from the flange 405. For example, the flange extension 505 can extend substantially perpendicular to the flange 405 such that the flange extension 505 at least partially extends along a side portion of the exterior carrier 430 of the first submodule 220 or the exterior carrier 430 of the second submodule 225 to support the first submodule 220 or the second submodule 225 (e.g., provide additional strength or facilitate maintaining the battery cells 120 in place within each submodule). The flange extension 505 can facilitate cooling a side portion (e.g., side walls 520, 525) of the battery module 115.

The thermal component 215 can include at least one flow path 1005 defined by one or more protrusions 1205 extending from the thermal component 215. For example, the inlet 1210 can receive a fluid which can flow along the flow path 1005 (e.g., directed by the one or more protrusions 1205 which can form a partition when coupled with the first submodule 220) through the thermal component 215 to the outlet 1215. For example, the thermal component 215 can facilitate cooling the battery cells 120 of first submodule 220 and the second submodule 225 of the battery module 115 by a coolant flowing through the flow path 1005.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. References to top or bottom, or other orientations, can indicate positioning when the battery pack 110 is in an orientation such as an installed orientation in the electric vehicle 105.

Other substitutions, modifications, changes and omissions can also be made in the design, operating conditions and arrangement of the disclosed elements and operations without departing from the scope of the present disclosure. For example, the thermal component 215 can include several flanges 405 that each extend from a portion of the thermal component 215. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
a thermal component configured to couple with a battery module at a middle portion of the battery module;
the thermal component comprises a plurality of flanges that extend outward beyond a side wall of the battery module;
the plurality of flanges comprising a first flange, a second flange, and a third flange, each of the first flange, the second flange, and the third flange stacked together substantially perpendicular to the side wall of the battery module and the second flange disposed between, at least partially in contact with, and protruding outward beyond the first flange and the third flange; and the plurality of flanges of the thermal component disposed between a first tote flange of the battery module and a second tote flange of the battery module.

2. The apparatus of claim 1, comprising:
the battery module comprises a first submodule, and a second submodule; and
the middle portion of the battery module is located between the first submodule and the second submodule such that the thermal component is disposed between the first submodule and the second submodule.

3. The apparatus of claim 1, comprising:
a first submodule of the battery module comprises a first plurality of battery cells and the first tote flange;
a second submodule of the battery module comprises a second plurality of battery cells and the second tote flange; and
the first tote flange, the second tote flange, and at least one of the plurality of flanges of the thermal component configured to be coupled together by at least one fastener.

4. The apparatus of claim 1, comprising:
the first flange at least partially in contact with the first tote flange and the third flange at least partially in contact with the second tote flange.

5. The apparatus of claim 1, comprising:
at least one flange of the plurality of flanges of the thermal component includes a fastener hole configured to receive a portion of a fastener and a locating hole configured to facilitate locating a feature; and
the thermal component passes through a center of gravity of the battery module.

6. The apparatus of claim 1, comprising:
the first flange disposed adjacent to the first tote flange; and
the third flange disposed adjacent to the second tote flange.

7. The apparatus of claim 1, comprising:
a first exterior carrier of the battery module includes the first tote flange;
a second exterior carrier of the battery module includes the second tote flange; and
a plurality of ribs formed with the first tote flange and the second tote flange to provide support for the side wall of the battery module.

8. The apparatus of claim 1, comprising:
at least one flange of the plurality of flanges includes a plurality of divots configured to at least partially receive a fastener;
the first tote flange includes a plurality of divots that each align with the plurality of divots of the at least one flange; and
the second tote flange includes a plurality of divots that each align with the plurality of divots of the at least one flange.

9. The apparatus of claim 1, comprising:
the thermal component passes through a center of gravity of the battery module.

10. The apparatus of claim 1, comprising:
the first tote flange configured to connect with a first cross member;
the second tote flange configured to connect with a second cross member; and
the first tote flange opposes the second tote flange.

11. A battery module, comprising:
a first exterior carrier for a first submodule and a second exterior carrier for a second submodule;
the first exterior carrier comprising a first tote flange and the second exterior carrier comprising a second tote flange;
a thermal component comprising a plurality of flanges that extend from the thermal component outward beyond a first side wall of the first submodule and a second side wall of the second submodule;
the plurality of flanges comprising a first flange, a second flange, and a third flange, each of the first flange, the second flange, and the third flange stacked together substantially perpendicular to the first side wall of the battery module and the second flange disposed between, at least partially in contact with, and protruding outward beyond the first flange and the third flange; and
the plurality of flanges of the thermal component configured to couple with the first submodule and the second submodule between the first tote flange of the first submodule and the second tote flange of the second submodule.

12. The battery module of claim 11, comprising:
the first flange at least partially in contact with the first tote flange and the third flange at least partially in contact with the second tote flange.

13. The battery module of claim 11, comprising:
at least one flange of the plurality of flanges of the thermal component includes a fastener hole configured to receive a portion of a fastener and a locating hole configured to facilitate locating a feature; and
the thermal component passes through a center of gravity of the battery module.

14. The battery module of claim 11, comprising:
the first flange disposed adjacent to the first tote flange; and
the third flange disposed adjacent to the second tote flange.

15. The battery module of claim 11, comprising:
the thermal component disposed at a middle portion of the battery module such that the thermal component passes through a center of gravity of the battery module.

16. The battery module of claim 11, comprising:
a plurality of ribs formed with the first tote flange and the second tote flange to provide support for the first side wall and the second side wall.

17. The battery module of claim 11, comprising:
at least one flange of the plurality of flanges includes a plurality of divots configured to at least partially receive a fastener;
the first tote flange includes a plurality of divots that each align with the plurality of divots of the at least one flange; and
the second tote flange includes a plurality of divots that each align with the plurality of divots of the at least one flange.

18. A method, comprising:
coupling a thermal component with a battery module at a middle portion of the battery module;
disposing a plurality of flanges of the thermal component to extend from a side wall of the battery module;
disposing the plurality of flanges between a first tote flange of the battery module and a second tote flange of the battery module; and
the plurality of flanges comprising a first flange, a second flange, and a third flange, each of the first flange, the second flange, and the third flange stacked together substantially perpendicular to the side wall of the battery module and the second flange disposed between, at least partially in contact with, and protruding outward beyond the first flange and the third flange.

19. The method of claim 18, comprising:

the first tote flange comprises a portion of a first exterior carrier of a first submodule of the battery module; and the second tote flange comprises a portion of a second exterior carrier of a second submodule of the battery module.

20. The method of claim 18, comprising:

a plurality of ribs formed with the first tote flange and the second tote flange to provide support for the side wall of the battery module.

\* \* \* \* \*